United States Patent
Zeng et al.

(10) Patent No.: US 11,088,786 B2
(45) Date of Patent: *Aug. 10, 2021

(54) DATA PROCESSING METHOD AND APPARATUS

(71) Applicant: Huawei Technologies Co., Ltd., Shenzhen (CN)

(72) Inventors: Qinghai Zeng, Shanghai (CN); Yi Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,218

(22) Filed: Oct. 30, 2019

(65) Prior Publication Data
US 2020/0067654 A1   Feb. 27, 2020

Related U.S. Application Data

(63) Continuation of application No. 15/679,750, filed on Aug. 17, 2017, now Pat. No. 10,491,336, which is a
(Continued)

(51) Int. Cl.
*H04L 1/18* (2006.01)
*H04W 72/04* (2009.01)
*H04W 72/14* (2009.01)

(52) U.S. Cl.
CPC .......... *H04L 1/1812* (2013.01); *H04L 1/1822* (2013.01); *H04L 1/1861* (2013.01);
(Continued)

(58) Field of Classification Search
CPC ... H04L 1/1812; H04L 1/1822; H04L 1/1861; H04L 1/1893; H04L 1/1896; H04W 72/0453; H04W 72/14
See application file for complete search history.

(56) References Cited

U.S. PATENT DOCUMENTS 8,239,721 B2 * 8/2012 Pelletier ............... H04L 5/0044
                                              714/749
8,386,874 B2 * 2/2013 Pelletier ............... H04L 5/0044
                                              714/749
(Continued)

FOREIGN PATENT DOCUMENTS

CN    101627570 A    1/2010
CN    101741525 A    6/2010
(Continued)

*Primary Examiner* — Ahmed Elallam
(74) *Attorney, Agent, or Firm* — Leydig, Voit & Mayer, Ltd.

(57) ABSTRACT

The present application describes a data processing method used for implementing data transmission between multiple carriers and a HARQ entity. A terminal receives mapping relationship information sent from a base station, where the mapping relationship information is used to indicate a mapping relationship between a HARQ entity of the terminal and a frequency resource configured by the base station for the terminal. The terminal determines the frequency resource. The terminal determines a HARQ entity corresponding to the frequency resource according to the mapping relationship information and processes a HARQ data block transmitted on the frequency resource by using the HARQ entity. Therefore, carrier communication channels for real-time transmission between the base station and the terminal are increased, to improve transmission efficiency.

16 Claims, 15 Drawing Sheets

Related U.S. Application Data continuation of application No. PCT/CN2015/073228, filed on Feb. 17, 2015.

(52) U.S. Cl.
CPC ....... H04L 1/1893 (2013.01); H04W 72/0453 (2013.01); H04W 72/14 (2013.01)

(56) References Cited

U.S. PATENT DOCUMENTS

| | | | |
|---|---|---|---|
| 8,588,142 B2 | 11/2013 | Seo et al. | |
| 8,605,674 B2 * | 12/2013 | Park | H04L 1/08 370/329 |
| 8,649,363 B2 | 2/2014 | Wu | |
| 8,730,889 B2 * | 5/2014 | Kim | H04L 5/0055 370/329 |
| 8,861,463 B2 | 10/2014 | Moon et al. | |
| 9,001,745 B2 | 4/2015 | Mcbeath | |
| 9,178,664 B2 | 11/2015 | Earnshaw et al. | |
| 9,325,454 B2 | 4/2016 | Sun et al. | |
| 9,461,778 B2 * | 10/2016 | Pietraski | H04L 1/1812 |
| 9,577,793 B2 * | 2/2017 | Davydov | H04L 1/1845 |
| 9,839,022 B2 | 12/2017 | Nayeb Nazar et al. | |
| 9,912,504 B2 * | 3/2018 | Krzymien | H04L 1/1896 |
| 9,980,262 B2 * | 5/2018 | Gao | H04L 1/1822 |
| 10,033,490 B2 | 7/2018 | Sadeghi et al. | |
| 10,187,186 B2 | 1/2019 | Chen et al. | |
| 10,454,632 B2 * | 10/2019 | Li | H04L 1/1822 |
| 10,491,336 B2 * | 11/2019 | Zeng | H04W 72/14 |
| 2002/0172208 A1 | 11/2002 | Malkamaki et al. | |
| 2007/0113138 A1 | 5/2007 | Kwon et al. | |
| 2010/0050036 A1 | 2/2010 | Chun et al. | |
| 2010/0110998 A1 | 5/2010 | Erceg et al. | |
| 2010/0254327 A1 | 10/2010 | Mcbeath et al. | |
| 2012/0057545 A1 | 3/2012 | Hariharan et al. | |
| 2012/0057560 A1 | 3/2012 | Park et al. | |
| 2012/0236815 A1 | 9/2012 | Hu et al. | |
| 2013/0182653 A1 | 7/2013 | Earnshaw et al. | |
| 2014/0126551 A1 | 5/2014 | Nammi et al. | |
| 2014/0211722 A1 | 7/2014 | Pietraski et al. | |
| 2015/0036637 A1 | 2/2015 | Nayeb Nazar | |
| 2015/0055589 A1 | 2/2015 | Yerramalli et al. | |
| 2016/0088635 A1 | 3/2016 | Davydov et al. | |
| 2016/0183276 A1 | 6/2016 | Marinier et al. | |

FOREIGN PATENT DOCUMENTS

| | | |
|---|---|---|
| CN | 101742525 A | 6/2010 |
| CN | 103684677 A | 3/2014 |
| CN | 103795510 A | 5/2014 |
| CN | 103812621 A | 5/2014 |
| KR | 20120015621 A | 2/2012 |

\* cited by examiner

DATA PROCESSING METHOD AND APPARATUS

CROSS-REFERENCE TO RELATED APPLICATIONS

This application is a continuation of U.S. patent application Ser. No. 15/679,750, filed on Aug. 17, 2017, which is a continuation of International Application No. PCT/CN2015/073228, filed on Feb. 17, 2015. All of the afore-mentioned patent applications are hereby incorporated by reference in their entireties.

TECHNICAL FIELD

The present disclosure relates to the field of communications technologies, and in particular, to a data processing method and apparatus.

BACKGROUND

In network communications, HARQ (hybrid automatic repeat request) is an anti-fading and anti-interference technology. Initially developed based on a wired network, data communications generally requires high bandwidth and transmission quality. As for a wired connection, reliability of data transmission is ensured by means of retransmission. When a transmission attempt fails, a data packet needs to be retransmitted. Such a transmission mechanism is referred to as ARQ (automatic repeat request). In a wireless transmission environment, channel transmission quality is poor due to fading caused by channel noise or mobility and interference from other users. Therefore, data packets need to be protected from various types of interference. The protection is mainly to use FEC (forward error correction) to transmit extra bits in the packets. However, excessive forward error correction reduces transmission efficiency. Therefore, HARQ, a hybrid solution combining ARQ and FEC, is put forward. It should be noted that when a terminal communicates with a base station by using the HARQ technology, a HARQ process is data transmission scheduled by the base station. A quantity of HARQ processes is a quantity of concurrent HARQs of the terminal. One HARQ entity may include multiple HARQ processes.

In the prior art, a terminal has a limited capability because of cost considerations, technical support, and other factors, and a quantity of supported HARQ entities is consequently limited (e.g., a maximum of only eight HARQ entities may be supported at present), that is, only transport blocks of a quantity equal to the quantity of supported HARQ entities (e.g., 8) can be received at one moment. A base station has many spectrums available and can configure a large quantity of frequency resources, such as, carriers or channels (e.g., 32) for the terminal to perform communication. However, the terminal cannot simultaneously receive, by using the HARQ entities, data blocks transmitted over all carriers or channels configured by the base station for the terminal. Consequently, the base station cannot communicate with the terminal by simultaneously using all carriers or channels configured for the terminal, and communication efficiency is limited.

SUMMARY

Exemplary embodiments disclosed herein provide a data processing method and apparatus, to improve data transmission efficiency.

A first aspect of the embodiments of the present disclosure provides a data processing method, including:

receiving, by a terminal, mapping relationship information sent from a base station, where the mapping relationship information is used to indicate a mapping relationship between a HARQ entity of the terminal and a frequency resource configured by the base station for the terminal;

determining, by the terminal, a frequency resource;

determining, by the terminal according to the mapping relationship information, a HARQ entity corresponding to the frequency resource; and processing, by the terminal by using the HARQ entity, a HARQ data block transmitted on the frequency resource.

With reference to the first aspect of the embodiments of the present disclosure, in a first implementation of the first aspect of the embodiments of the present disclosure, the frequency resource includes a configured carrier; and the mapping relationship information includes:

a carrier list and a HARQ entity index or identifier corresponding to each carrier in the carrier list;

carrier group information, where a quantity of carrier groups in the carrier group information is less than or equal to a maximum quantity of HARQ entities supported by the terminal, and carriers in a same carrier group are corresponding to a same HARQ entity;

a carrier list and a sequence number of each carrier in the carrier list; or a carrier list, and a sequence number of each carrier and status information of each carrier in the carrier list, where a status of the carrier includes any one of an active state or an inactive state.

With reference to the first aspect of the embodiments of the present disclosure, in a second implementation of the first aspect of the embodiments of the present disclosure, the frequency resource includes a configured carrier;

the determining, by the terminal, a frequency resource includes: determining, by the terminal, the configured carrier according to received scheduling grant signaling that includes a configured carrier identifier and that is sent from the base station, where the scheduling grant signaling further includes an indication message of a HARQ entity corresponding to the configured carrier; and the determining, by the terminal according to the mapping relationship information, a HARQ entity corresponding to the frequency resource includes: determining, by the terminal according to the indication message, the HARQ entity corresponding to the configured carrier.

With reference to the first aspect of the embodiments of the present disclosure, the first implementation of the first aspect, and the second implementation of the first aspect, in a third implementation of the first aspect of the embodiments of the present disclosure, when failing to send the HARQ data block and receiving no scheduling grant signaling used for retransmitting the HARQ data block, the terminal determines a retransmission frequency resource corresponding to the HARQ entity; and the terminal retransmits the HARQ data block to the base station by using the retransmission frequency resource.

With reference to the first aspect of the embodiments of the present disclosure, the first implementation of the first aspect, the second implementation of the first aspect, and the third implementation of the first aspect, in a fourth implementation of the first aspect of the embodiments of the present disclosure, after the receiving, by a terminal, mapping relationship information sent from a base station, the method further includes:

when the terminal determines, according to the mapping relationship information, that a new HARQ entity is mapped to the frequency resource configured by the base station, performing an initialization operation on the new HARQ entity; or when the terminal determines, according to the mapping relationship information, that a used HARQ entity is no longer corresponding to any frequency resource, deleting the HARQ entity corresponding to no frequency resource.

With reference to the first aspect of the embodiments of the present disclosure, the first implementation of the first aspect, the second implementation of the first aspect, the third implementation of the first aspect, and the fourth implementation of the first aspect, in a fifth implementation of the first aspect of the embodiments of the present disclosure, the processing, by the terminal by using the HARQ entity, a HARQ data block transmitted on the frequency resource specifically includes:

performing, by the terminal by using the HARQ entity, first processing on a first HARQ data block that needs to be transmitted on the frequency resource, where the first processing includes generating the first HARQ data block; or performing, by the terminal by using the HARQ entity, second processing on a second HARQ data block received by using the frequency resource, where the second processing includes: if the second HARQ data blocks are HARQ data blocks sent from the base station by using different frequency resources, selecting, by the terminal according to the mapping relationship information, a corresponding HARQ entity to perform combined decoding and data decoding on the second HARQ data blocks; or if the second HARQ data blocks are HARQ data blocks sent from the base station by using a same frequency resource, selecting, by the terminal according to the mapping relationship information, a corresponding HARQ entity to perform data decoding on the second HARQ data blocks.

With reference to the fifth implementation of the first aspect of the embodiments of the present disclosure, in a sixth implementation of the first aspect of the embodiments of the present disclosure, the second processing further includes:

if the second HARQ data block is a retransmitted data block, and the frequency resource used for transmitting the second HARQ data block is corresponding to the HARQ entity, performing, by the terminal, data decoding on the second HARQ data block by using the HARQ entity; and when the data decoding fails, performing, by the terminal, combined decoding on the second HARQ data block and content of the second HARQ data block in a receive buffer.

A second aspect of the embodiments of the present disclosure provides a data processing method, including:

sending, by a base station, mapping relationship information to a terminal, where the mapping relationship information is used to indicate a mapping relationship between a HARQ entity of the terminal and a frequency resource configured by the base station for the terminal; and sending, by the base station, scheduling grant signaling to the terminal, so that the terminal determines a frequency resource according to the scheduling grant signaling, the terminal determines, according to the mapping relationship information, a HARQ entity corresponding to the frequency resource, and the terminal processes, by using the HARQ entity, a HARQ data block transmitted on the frequency resource.

With reference to the second aspect of the embodiments of the present disclosure, in a first implementation of the second aspect of the embodiments of the present disclosure, the frequency resource includes a configured carrier; and the mapping relationship information includes:

a carrier list and a HARQ entity index or identifier corresponding to each carrier in the carrier list;

carrier group information, where a quantity of carrier groups in the carrier group information is less than or equal to a maximum quantity of HARQ entities supported by the terminal, and carriers in a same carrier group are corresponding to a same HARQ entity;

a carrier list and a sequence number of each carrier in the carrier list; or a carrier list, and a sequence number of each carrier and status information of each carrier in the carrier list, where a status of the carrier includes any one of an active state or an inactive state.

With reference to the second aspect of the embodiments of the present disclosure, in a second implementation of the second aspect of the embodiments of the present disclosure, the frequency resource includes a configured carrier, and the scheduling grant signaling includes a configured carrier identifier and an indication message of a HARQ entity corresponding to the configured carrier, so that the terminal determines the configured carrier according to the configured carrier identifier, and determines, according to the indication message, the HARQ entity corresponding to the configured carrier.

A third aspect of the embodiments of the present disclosure provides a terminal, including:

a first receiving unit, configured to receive mapping relationship information sent from a base station, where the mapping relationship information is used to indicate a mapping relationship between a HARQ entity of the terminal and a frequency resource configured by the base station for the terminal;

a first determining unit, configured to determine a frequency resource;

a second determining unit, configured to: after the first determining unit determines the frequency resource, determine, according to the mapping relationship information, a HARQ entity corresponding to the frequency resource; and a processing unit, configured to process, by using the HARQ entity, a HARQ data block transmitted on the frequency resource.

With reference to the third aspect of the embodiments of the present disclosure, in a first implementation of the third aspect of the embodiments of the present disclosure, the frequency resource includes a configured carrier; and the mapping relationship information includes:

a carrier list and a HARQ entity index or identifier corresponding to each carrier in the carrier list;

carrier group information, where a quantity of carrier groups in the carrier group information is less than or equal to a maximum quantity of HARQ entities supported by the terminal, and carriers in a same carrier group are corresponding to a same HARQ entity;

a carrier list and a sequence number of each carrier in the carrier list; or a carrier list, and a sequence number of each carrier and status information of each carrier in the carrier list, where a status of the carrier includes any one of an active state or an inactive state.

With reference to the third aspect of the embodiments of the present disclosure, in a second implementation of the third aspect of the embodiments of the present disclosure, the frequency resource includes a configured carrier;

the first determining unit includes a first determining module, configured to determine the configured carrier according to the received scheduling grant signaling that includes a configured carrier identifier and that is sent from the base station, where the scheduling grant signaling further includes an indication message of a HARQ entity corresponding to the configured carrier; and the second determining unit includes a second determining module, configured to determine, according to the indication message, the HARQ entity corresponding to the configured carrier.

With reference to the third aspect of the embodiments of the present disclosure, the first implementation of the third aspect, and the second implementation of the third aspect, in a third implementation of the third aspect of the embodiments of the present disclosure, the terminal further includes:

a third determining unit, configured to: when the terminal fails to send the HARQ data block and receives no scheduling grant signaling used for retransmitting the HARQ data block, determine a retransmission frequency resource corresponding to the HARQ entity; and a first sending unit, configured to: after the retransmission frequency resource corresponding to the HARQ entity is determined, retransmit the HARQ data block to the base station by using the retransmission frequency resource.

With reference to the third aspect of the embodiments of the present disclosure, the first implementation of the third aspect, the second implementation of the third aspect, and the third implementation of the third aspect, in a fourth implementation of the third aspect of the embodiments of the present disclosure, the terminal further includes:

an initialization unit, configured to: after the first receiving unit receives the mapping relationship information sent from the base station, and when it is determined, according to the mapping relationship information, that a new HARQ entity is mapped to the frequency resource configured by the base station, perform an initialization operation on the new HARQ entity; and a deletion unit, configured to: after the first receiving unit receives the mapping relationship information sent from the base station, and when the terminal determines, according to the mapping relationship information, that a used HARQ entity is no longer corresponding to any frequency resource, delete the HARQ entity corresponding to no frequency resource.

With reference to the third aspect of the embodiments of the present disclosure, the first implementation of the third aspect, the second implementation of the third aspect, the third implementation of the third aspect, and the fourth implementation of the third aspect, in a fifth implementation of the third aspect of the embodiments of the present disclosure, the processing unit specifically includes:

a first processing module, configured to perform, by using the HARQ entity, first processing on a first HARQ data block that needs to be transmitted on the frequency resource, where the first processing includes: generating the first HARQ data block; and a second processing module, configured to perform, by using the HARQ entity, second processing on a second HARQ data block received by using the frequency resource, where the second processing includes: if the second HARQ data blocks are HARQ data blocks sent from the base station by using different frequency resources, selecting, by the second processing module according to the mapping relationship information, a corresponding HARQ entity to perform combined decoding and data decoding on the second HARQ data blocks; or if the second HARQ data blocks are HARQ data blocks sent from the base station by using a same frequency resource, selecting, by the second processing module according to the mapping relationship information, a corresponding HARQ entity to perform data decoding on the second HARQ data blocks.

With reference to the fifth implementation of the third aspect of the embodiments of the present disclosure, in a sixth implementation of the third aspect of the embodiments of the present disclosure, the second processing module further includes:

a second processing submodule, configured to: if the second HARQ data block is a retransmitted data block, and the frequency resource used for transmitting the second HARQ data block is corresponding to the HARQ entity, perform data decoding on the second HARQ data block by using the HARQ entity; and when the data decoding fails, perform combined decoding on the second HARQ data block and content of the second HARQ data block in a receive buffer.

A fourth aspect of the embodiments of the present disclosure provides a base station, including:

a second sending unit, configured to send mapping relationship information to a terminal, where the mapping relationship information is used to indicate a mapping relationship between a HARQ entity of the terminal and a frequency resource configured by the base station for the terminal; and a third sending unit, configured to send scheduling grant signaling to the terminal, so that the terminal determines a frequency resource according to the scheduling grant signaling, the terminal determines, according to the mapping relationship information, a HARQ entity corresponding to the frequency resource, and the terminal processes, by using the HARQ entity, a HARQ data block transmitted on the frequency resource.

With reference to the fourth aspect of the embodiments of the present disclosure, in a first implementation of the fourth aspect of the embodiments of the present disclosure, the frequency resource includes a configured carrier; and the mapping relationship information includes:

a carrier list and a HARQ entity index or identifier corresponding to each carrier in the carrier list;

carrier group information, where a quantity of carrier groups in the carrier group information is less than or equal to a maximum quantity of HARQ entities supported by the terminal, and carriers in a same carrier group are corresponding to a same HARQ entity;

a carrier list and a sequence number of each carrier in the carrier list; or a carrier list, and a sequence number of each carrier and status information of each carrier in the carrier list, where a status of the carrier includes any one of an active state or an inactive state.

With reference to the fourth aspect of the embodiments of the present disclosure, in a second implementation of the fourth aspect of the embodiments of the present disclosure, the frequency resource includes a configured carrier, and the scheduling grant signaling includes a configured carrier identifier and an indication message of a HARQ entity corresponding to the configured carrier, so that the terminal determines the configured carrier according to the configured carrier identifier, and determines, according to the indication message, the HARQ entity corresponding to the configured carrier.

In some exemplary embodiments, when a terminal receives information that is sent from a base station and that is used to indicate a mapping relationship between a HARQ entity of the terminal and a frequency resource configured by the base station for the terminal, even if a quantity of frequency resources configured by the base station for the terminal is greater than a quantity of HARQ entities supported by the terminal, after determining a configured frequency resource, the terminal can determine, according to the mapping relationship information, a HARQ entity corresponding to the frequency resource, and process, by using the HARQ entity, a HARQ data block transmitted on the frequency resource. A HARQ entity is shared, so that during transmission of a HARQ data block with the terminal, the base station can select one or more carriers corresponding to the HARQ entity. Therefore, carrier communication channels for real-time transmission between the base station and the terminal are increased, to improve transmission efficiency. Furthermore, an opportunity is provided for the terminal to select a high-quality carrier channel, to improve transmission quality.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description merely illustrate some embodiments, and persons of ordinary skill in the art may still derive other embodiments from these accompanying drawings without creative efforts.

DESCRIPTION OF EMBODIMENTS

Figure 1:
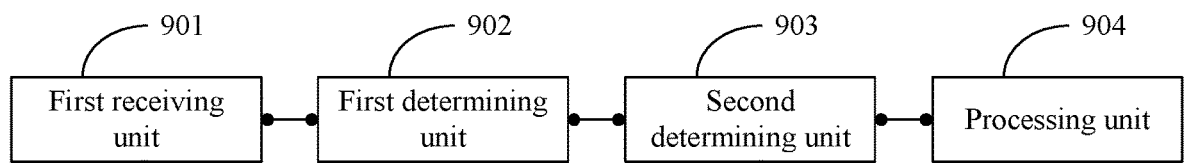
FIG. 1 is a schematic diagram of an embodiment of a data processing terminal according to the embodiments.

The following description discloses a data processing method and a related apparatus. The following describes, in detail, a specific form of a terminal provided in some embodiments, with reference to FIG. 1.

An embodiment of the terminal includes: a first receiving unit 901 that is configured to receive mapping relationship information sent from a base station.

The mapping relationship information is used to indicate a mapping relationship between a HARQ entity of the terminal and a frequency resource configured by the base station for the terminal.

Before the base station sends the mapping relationship information to the terminal, the base station first obtains hybrid automatic repeat request, HARQ, entity resource capability information of the terminal. In embodiments of the present disclosure, the HARQ entity resource capability information may include information about a maximum quantity of HARQ entities supported by the terminal.

In embodiments of the present disclosure, the base station may obtain the HARQ entity resource capability information of the terminal in the following manners: the terminal reports the HARQ entity resource capability information of the terminal to the base station in a process of connecting to a network or after connecting to a network; when the terminal is handed over or establishes a connection to a new base station, the new base station may obtain, in a handover preparation process, the HARQ entity resource capability information of the terminal from a base station that the terminal is previously connected to; the base station may alternatively obtain the HARQ entity resource capability information of the terminal by using an MME (mobility management entity); the base station stores the HARQ entity resource capability information of the terminal; or the base station determines the HARQ entity resource capability information of the terminal according to protocol specifications. The base station determines, according to the frequency resource configured for the terminal and the obtained HARQ entity resource capability information of the terminal, the mapping relationship between a HARQ entity of the terminal and a frequency resource configured by the base station for the terminal, and sends the mapping relationship information to the terminal, so that the terminal can determine, according to the mapping relationship information, a HARQ entity corresponding to a carrier.

A first determining unit 902 is configured to determine a frequency resource.

Generally, each time when scheduling the terminal to send or receive data, the base station indicates to the terminal scheduling grant signaling for the frequency resource used in the scheduling, so that the terminal can determine, according to the scheduling grant signaling, the frequency resource used in the scheduling, to send data. The scheduling grant signaling may or may not include information about the scheduled frequency resource (e.g., a cell index). If the scheduling grant signaling includes the information about the scheduled frequency resource, the first determining unit 902 may determine, according to the frequency resource information, the frequency resource that the terminal needs to use. If the scheduling grant signaling does not include the information about the scheduled frequency resource, the first determining unit 902 may determine that the required frequency resource is a frequency resource used for transmitting the scheduling grant signaling.

A second determining unit 903 is configured to: after the first determining unit 902 determines the frequency resource, determine, according to the mapping relationship information, a HARQ entity corresponding to the frequency resource.

After receiving the scheduling grant signaling, the terminal may determine, according to the mapping relationship information, the HARQ entity corresponding to the frequency resource, so that the base station and the terminal implement transmission of a HARQ data block.

A processing unit 904 is configured to process, by using the HARQ entity, a HARQ data block transmitted on the frequency resource.

After determining the frequency resource and the corresponding HARQ entity, the terminal processes, by using the HARQ entity, the HARQ data block transmitted on the frequency resource, that is, processes a HARQ data block that needs to be transmitted on the frequency resource, and processes a HARQ data block received by using the frequency resource.

In this embodiment of the present disclosure, when a terminal receives information that is sent from a base station and that is used to indicate a mapping relationship between a HARQ entity of the terminal and a frequency resource configured by the base station for the terminal, even if a quantity of frequency resources configured by the base station for the terminal is greater than a quantity of HARQ entities supported by the terminal, after determining a configured frequency resource, the terminal can determine, according to the mapping relationship information, a HARQ entity corresponding to the frequency resource, and process, by using the HARQ entity, a HARQ data block transmitted on the frequency resource. A HARQ entity is shared, so that during transmission of a HARQ data block with the terminal, the base station can select one or more carriers corresponding to the HARQ entity. Therefore, carrier communication channels for real-time transmission between the base station and the terminal are increased, to improve transmission efficiency. Furthermore, an opportunity is provided for the terminal to select a high-quality carrier channel, to improve transmission quality.

In this embodiment of the present disclosure, the frequency resource may include a configured carrier. The mapping relationship information may include a carrier list and a HARQ entity index or identifier corresponding to each carrier in the carrier list. When failing to send the HARQ data block and receiving no scheduling grant signaling used for retransmitting the HARQ data block, the terminal determines a retransmission frequency resource corresponding to the HARQ entity to retransmit the HARQ data block.

After receiving the mapping relationship information sent from the base station, the terminal further includes: when determining, according to the mapping relationship information, that a new HARQ entity is mapped to the frequency resource configured by the base station, performing an initialization operation on the new HARQ entity; or when determining, according to the mapping relationship information, that a used HARQ entity is no longer corresponding to any frequency resource, deleting the HARQ entity corresponding to no frequency resource. The following provides detailed description.

Figure 2:
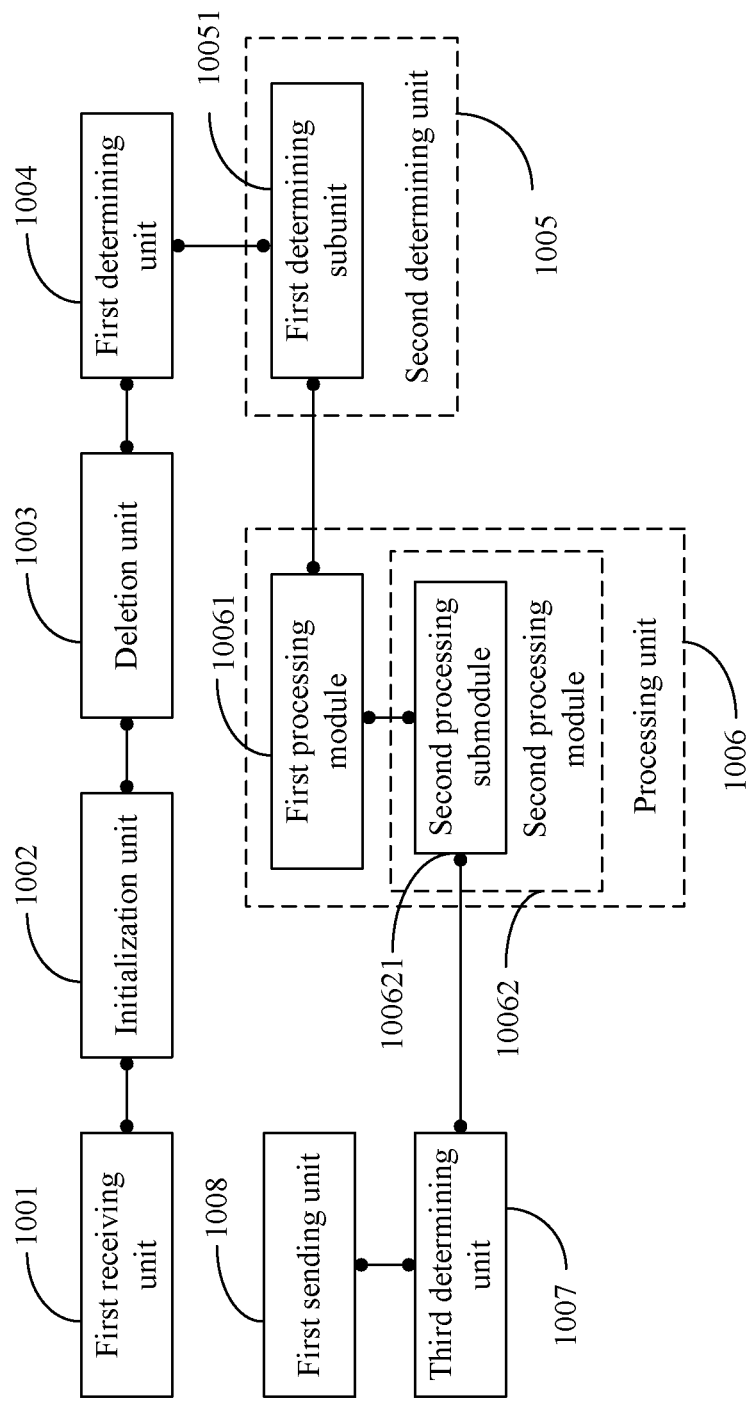
FIG. 2 is a schematic diagram of another embodiment of a data processing terminal according to the embodiments.

Referring to FIG. 2, another embodiment of the terminal includes: a first receiving unit 1001 is configured to receive mapping relationship information sent from a base station. The mapping relationship information is used to indicate a mapping relationship between a HARQ entity of the terminal and a frequency resource configured by the base station for the terminal, and the frequency resource includes a configured carrier.

The configured carrier is a carrier configured by the base station for the terminal. It should be noted that the frequency resource may be alternatively a channel configured by the base station for the terminal. Both the carrier and the channel are expression manners of a frequency resource in wireless transmission. In addition, in a wireless transmission scenario, a carrier may be divided into multiple subchannels, and the frequency resource may be alternatively the multiple subchannels in the carrier.

Optionally, the terminal may receive, by receiving an RRC (radio resource control) reconfiguration message sent from the base station, the mapping relationship information sent from the base station.

An initialization unit 1002 is configured to: after the first receiving unit 1001 receives the mapping relationship information sent from the base station, and when the terminal determines, according to the mapping relationship information, that a new HARQ entity is mapped to the frequency resource configured by the base station, perform an initialization operation on the new HARQ entity.

The first receiving unit 1001 receives the mapping relationship information between a carrier configured by the base station for the terminal and a HARQ entity. When that the new HARQ entity is mapped to the carrier configured by the base station is determined according to the mapping relationship information, the initialization operation is performed on the new HARQ entity, for example, a CURRENT_TX_NB (current transmission number) of each HARQ process is initialized to 0.

A deletion unit 1003 is configured to: after the first receiving unit 1001 receives the mapping relationship information sent from the base station, and when the terminal determines, according to the mapping relationship information, that a used HARQ entity is no longer corresponding to any frequency resource, delete the HARQ entity corresponding to no frequency resource.

When determining, according to the mapping relationship information, that the used HARQ entity is no longer corresponding to any frequency resource, the terminal deletes the corresponding HARQ entity, to improve resource utilization. Optionally, if the terminal receives the mapping relationship message by receiving the RRC reconfiguration message sent from the base station, the terminal may further return an RRC reconfiguration complete message to the base station.

A first determining unit 1004 is configured to determine a frequency resource.

Generally, each time when scheduling the terminal to send or receive data, the base station indicates to the terminal scheduling grant signaling for the frequency resource used in the scheduling, so that the first determining unit 1004 can determine, according to the scheduling grant signaling, the frequency resource used in the scheduling, to send data. The scheduling grant signaling may or may not include information about the scheduled frequency resource (e.g., a cell index). If the scheduling grant signaling includes the information about the scheduled frequency resource, the first determining unit 1004 may determine, according to the frequency resource information, the frequency resource that the terminal needs to use. If the scheduling grant signaling does not include the information about the scheduled frequency resource, the first determining unit 1004 may determine that the required frequency resource is a frequency resource used for transmitting the scheduling grant signaling.

The mapping relationship information includes a carrier list and a HARQ entity index corresponding to each carrier in the carrier list. A second determining unit 1005 includes a first determining subunit 10051, configured to determine, according to the carrier list and the HARQ entity index corresponding to each carrier in the carrier list, a HARQ entity corresponding to the configured carrier.

After the first determining unit 1004 receives the scheduling grant signaling, the second determining unit 1005 may then determine, according to the mapping relationship information, the HARQ entity corresponding to the configured carrier, so that the base station and the terminal implement transmission of a HARQ data block. Optionally, the mapping relationship information includes the carrier list and the HARQ entity index corresponding to each carrier. The first determining subunit 10051 determines, according to the carrier list and the HARQ entity index corresponding to each carrier, the HARQ entity corresponding to the configured carrier. For example, there are eight HARQ entities of the terminal and 32 carriers configured by the base station for the terminal; the mapping relationship information includes a carrier list of the 32 carriers and a HARQ entity index (whose value range is 0-7) corresponding to each carrier; and in this embodiment, a HARQ entity whose index value is 0 may be constantly used for a primary carrier. In this case, after the first determining unit 1004 determines the configured carrier according to the scheduling grant signaling, the first determining subunit 10051 determines a HARQ entity (e.g., the fourth HARQ entity) according to a HARQ entity index (e.g., an index value of 3) corresponding to the configured carrier, and processes, in the determined HARQ entity, a HARQ data block in this scheduling.

It should be noted that the mapping relationship information may alternatively include a carrier list and a HARQ entity identifier corresponding to each carrier. The second determining unit 1005 may alternatively determine, according to the carrier list and the HARQ entity identifier corresponding to each carrier, the HARQ entity corresponding to the configured carrier. A specific implementation is similar to the foregoing content, and details are not repeated herein.

A processing unit 1006 includes a first processing module 10061, configured to perform, by using the HARQ entity, first processing on a first HARQ data block that needs to be transmitted on the frequency resource. The first processing includes generating the first HARQ data block.

In an uplink direction, after the second determining unit 1005 determines the configured carrier and the corresponding HARQ entity, the first processing is performed on the first HARQ data block by using the HARQ entity. The first processing includes generating the first HARQ data block, performing redundancy version update processing on the retransmitted first HARQ data block, or the like. The first HARQ data block that undergoes the first processing may be sent to the base station by using the configured carrier.

The processing unit 1006 further includes a second processing module 10062, configured to perform, by using the HARQ entity, second processing on a second HARQ data block received by using the frequency resource. The second processing includes: If the second HARQ data blocks are HARQ data blocks sent from the base station by using different frequency resources, the second processing module 10062 selects, according to the mapping relationship information, corresponding HARQ entities to perform combined decoding and data decoding on the second HARQ data blocks; or if the second HARQ data blocks are HARQ data blocks sent from the base station by using a same frequency resource, the second processing module 10062 selects, according to the mapping relationship information, a corresponding HARQ entity to perform data decoding on the second HARQ data blocks.

In a downlink direction, after the second determining unit 1005 determines the configured carrier and the corresponding HARQ entity, the terminal receives the second HARQ data block by using the configured carrier, and the second processing module 10062 performs the second processing on the second HARQ data block by using the HARQ entity, so that the terminal can parse the second HARQ data block.

The second processing module 10062 further includes a second processing submodule 100621, configured to: if the second HARQ data block is a retransmitted data block, and the frequency resource used for transmitting the second HARQ data block is corresponding to the HARQ entity, perform data decoding on the second HARQ data block by using the HARQ entity. When the data decoding fails, the terminal performs combined decoding on the second HARQ data block and content of the second HARQ data block in a receive buffer.

If the second HARQ data block is a retransmitted data block, no matter whether the carrier used for transmitting the retransmitted data block is the same as a carrier used for a previous transmission (initial transmission or retransmission) of the second HARQ data block, provided that all these carriers used for transmitting the second HARQ data block are corresponding to a HARQ entity, a HARQ entity is selected according to the mapping relationship information, to perform data decoding on the second HARQ data block. If the data decoding fails, combined decoding is further performed on the received second HARQ data block and content of the second HARQ data block in a receive buffer, to improve a decoding success rate. Optionally, the second processing module 10062 may further temporarily save the second HARQ data block after the second HARQ data block fails to be decoded.

A third determining unit 1007 is configured to: when the terminal fails to send the HARQ data block and receives no scheduling grant signaling used for retransmitting the HARQ data block, determine a retransmission frequency resource corresponding to the HARQ entity.

After the terminal transmits a HARQ data block on the configured carrier determined, if the HARQ data block fails to be transmitted, the terminal may receive scheduling information, sent from the base station to the terminal, for retransmission of the HARQ data block. The terminal may be scheduled by the base station to retransmit the HARQ data block over another carrier that uses the same HARQ entity as the previously used carrier. In this case, except for using the another carrier to perform HARQ retransmission, processing performed by the terminal on the HARQ data block, such as a redundancy version calculation rule and HARQ retransmission moment calculation, is the same as retransmission processing performed on the previously selected carrier.

A first sending unit 1008 is configured to: after the retransmission frequency resource corresponding to the HARQ entity is determined, retransmit the HARQ data block to the base station by using the retransmission frequency resource.

Generally, the base station supports non-adaptive HARQ retransmission in the uplink direction, that is, after the terminal receives from the base station a feedback that an uplink HARQ data block fails to be transmitted, and when the terminal receives no scheduling information from the base station for retransmitting the HARQ data block, the terminal may retransmit, on a previously scheduled resource at a next retransmission moment according to an agreed redundancy version calculation rule and HARQ retransmission moment calculation rule, the HARQ data block in a redundancy version that is obtained according to the calculation rule. When multiple carriers are mapped to a same HARQ entity, the base station may further designate or agree on in a protocol a non-adaptive retransmission order of the uplink HARQ data block over the carriers. For example, carriers A, B, and C are mapped to a same HARQ entity, the base station designates a non-adaptive transmission order of the uplink HARQ data block over the three carriers, cyclically, on A, B, and C, and a redundancy version generation rule is in an order of 0, 2, 3, and 1, cyclically. It is assumed that the uplink HARQ data block in the redundancy version 1 fails to be transmitted over the carrier B, and the terminal receives no scheduling information for the data block at a next retransmission moment from the base station, the terminal retransmits, by using the previously scheduled resource, the HARQ data block in the redundancy version 0 over the carrier C at the next retransmission moment. In this way, initial transmission and each retransmission of a same HARQ data block are not confined to a same carrier, and a carrier with a best radio channel at that time may be selected for transmission.

In this embodiment of the present disclosure, when a terminal determines, according to mapping relationship information, that a new HARQ entity is mapped to a carrier configured by a base station, the terminal performs an initialization operation on the new HARQ entity, so as to ensure accuracy for HARQ data block transmission. When determining, according to the mapping relationship information, that a used HARQ entity is no longer corresponding to any carrier, the terminal deletes the HARQ entity corresponding to no carrier, so as to reduce waste of a HARQ entity resource. The terminal determines, according to a carrier list and a HARQ entity index corresponding to each carrier in the carrier list, a HARQ entity corresponding to a configured carrier, so that a HARQ entity is mapped to multiple carriers by using the carrier list and the HARQ entity index, selectable frequencies are increased, and transmission quality is improved. When failing to send a first HARQ data block and receiving no scheduling grant signaling, the terminal determines a configured retransmission carrier corresponding to the HARQ entity, and retransmits the first HARQ data block to the base station by using the configured retransmission carrier, so that a different carrier is selected for retransmission, and a transmission success rate is increased. When the terminal receives a second HARQ data block sent from the base station, if the second HARQ data blocks are HARQ data blocks sent from the base station by using different carriers, the terminal selects, according to the mapping relationship information, a corresponding HARQ entity to perform combined decoding and data decoding on the second HARQ data blocks; or if the second HARQ data blocks are HARQ data blocks sent from the base station by using a same carrier, the terminal selects, according to the mapping relationship information, a corresponding HARQ entity to perform data decoding on the second HARQ data blocks. This implements combined decoding on a HARQ entity and improves transmission quality.

In the foregoing embodiments, the terminal determines, according to the carrier list and the HARQ entity index corresponding to each carrier, the HARQ entity corresponding to the configured carrier. In actual application, the terminal may alternatively determine, according to carrier group information, the HARQ entity corresponding to the configured carrier, and details are provided in the following.

Figure 3:
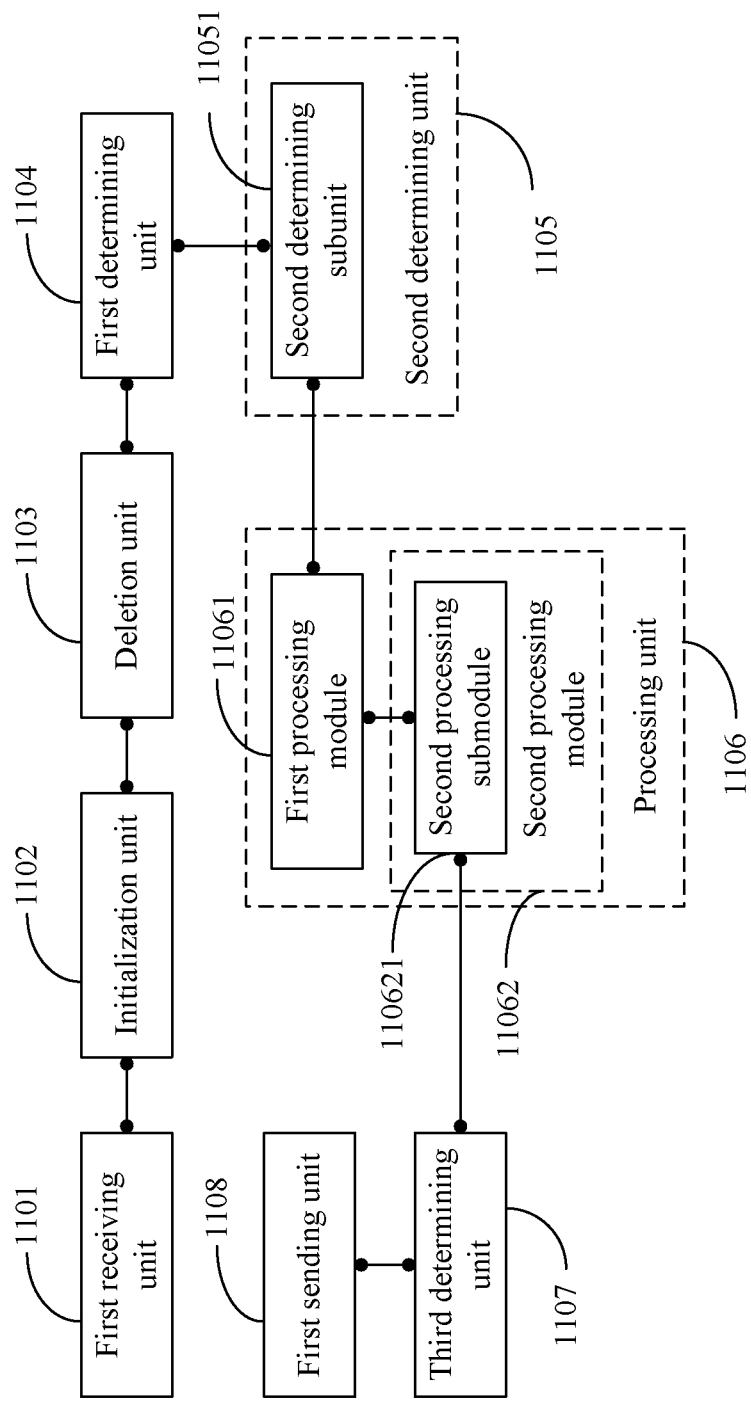
FIG. 3 is a schematic diagram of another embodiment of a data processing terminal according to the embodiments.

Referring to FIG. 3, another embodiment of the terminal includes: a first receiving unit 1101, an initialization unit 1102, a deletion unit 1103, a first determining unit 1104, a second determining unit 1105, a second determining subunit 11051 included in the second determining unit 1105, a processing unit 1106, a first processing module 11061 included in the processing unit 1106, a second processing module 11062 included in the processing unit 1106, a second processing submodule 110621 included in the second processing module 11062, a third determining unit 1107, and a first sending unit 1108. For connection relationships and functions of 1101 to 1104, refer to 1001 to 1004 in the embodiment of FIG. 2. For connection relationships and functions of 1106, 11061, 11062, 110621, 1107, and 1108, refer to 1006, 10061, 10062, 100621, 1007, and 1008 in the embodiment of FIG. 2. The second determining subunit 11051 included in the second determining unit 1105 is connected to the first determining unit 1104 and the processing unit 1106.

The mapping relationship information includes the carrier group information. A quantity of carrier groups in the carrier group information is less than or equal to a maximum quantity of HARQ entities supported by the terminal, and carriers in a same carrier group are corresponding to a same HARQ entity. The second determining unit 1105 includes the second determining subunit 11051, configured to determine, according to the carrier group information, a HARQ entity corresponding to the configured carrier.

If there are eight HARQ entities, the quantity of carrier groups included in the carrier group information is less than or equal to eight. The terminal considers by default that different carrier groups use different HARQ entities, respectively. The terminal determines which specific carrier group is corresponding to a HARQ entity, provided that the different carrier groups use the different HARQ entities. For example, there are eight HARQ entities of the terminal and 32 carriers configured by the base station for the terminal; eight groups of group information of the 32 carriers are included in the mapping relationship information, and each group includes four carriers. In this case, after determining the configured carrier (e.g., a carrier in a group 2), the terminal determines the corresponding HARQ entity (e.g., the first HARQ entity according to a decision of the terminal) according to a group to which the configured carrier belongs (e.g., the group 2).

In this embodiment of the present disclosure, mapping relationship information received by the terminal includes carrier group information; a quantity of carrier groups in the carrier group information is less than or equal to a maximum quantity of HARQ entities supported by the terminal, and carriers in a same carrier group are corresponding to a same HARQ entity; and the terminal determines, according to the carrier group information, a HARQ corresponding to a configured carrier. This both increases selectable carrier frequencies, and reduces signaling overheads.

In the foregoing embodiments, the terminal determines, according to the carrier group information, the HARQ entity corresponding to the configured carrier. In actual application, the terminal may alternatively determine, according to a carrier list, a sequence number of each carrier, and status information of each carrier, the HARQ entity corresponding to the configured carrier, and details are provided in the following.

Figure 4:
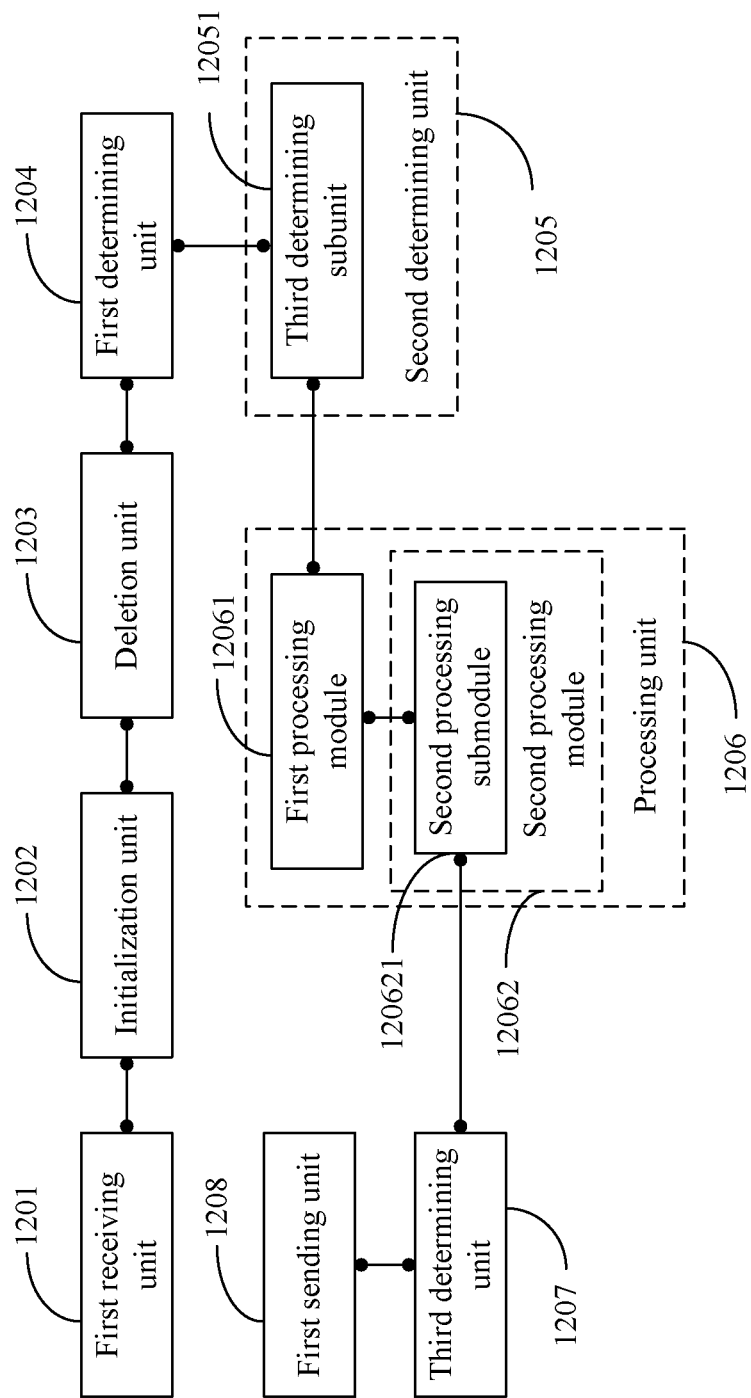
FIG. 4 is a schematic diagram of another embodiment of a data processing terminal according to the embodiments.

Referring to FIG. 4, another embodiment of the terminal includes: a first receiving unit 1201, an initialization unit 1202, a deletion unit 1203, a first determining unit 1204, a second determining unit 1205, a third determining subunit 12051 included in the second determining unit 1205, a processing unit 1206, a first processing module 12061 included in the processing unit 1206, a second processing module 12062 included in the processing unit 1206, a 120621 included in the second processing module 12062, a third determining unit 1207, and a first sending unit 1208. For connection relationships and functions of 1201 to 1204, refer to 1001 to 1004 in the embodiment of FIG. 2. For connection relationships and functions of 1206, 12061, 12062, 120621, 1207, and 1208, refer to 1006, 10061, 10062, 100621, 1007, and 1008 in the embodiment of FIG. 2. The second determining subunit 12051 included in the second determining unit 1205 is connected to the first determining unit 1204 and the processing unit 1206.

The mapping relationship information includes a carrier list, and a sequence number of each carrier and status information of each carrier in the carrier list. A status of the carrier includes any one of an active state or an inactive state. The second determining unit 1205 includes the third determining subunit 12051, configured to determine, according to the carrier list, and the sequence number and the status information of each carrier in the carrier list, the HARQ entity corresponding to the configured carrier.

If there are 32 carriers configured by the base station for the terminal, the status information of the carrier may indicate, by using a 32-bit bitmap, statuses (e.g., the active state or the inactive state) of the 32 configured carriers. The $n^{th}$ (counting from 0) bit in the bitmap being 1 indicates that a configured carrier with an index of n is in the active state. Specifically, if an active carrier ranks number n (counting from 0 or 1, and in this example, counting from 1) among all active carriers indicated in the status information bitmap, all active carriers with a same value obtained from n mod 8 use a same HARQ entity. For example, the bitmap of the active/inactive state in the status information of the carrier is as follows. Except for a primary carrier, 13 secondary carriers with indexes of 4, 6, 7, 8, 10, 14, 17, 18, 20, 23, 26, 29, and 30 are in the active state, and they are ranked the first to the thirteenth among all active carriers. Therefore, the carriers with the indexes of 4 and 20 use a same HARQ entity, the carriers with the indexes of 6 and 23 use a same HARQ entity, the carriers with the indexes of 7 and 26 use a same HARQ entity, the carriers with the indexes of 8 and 29 use a same HARQ entity, the carriers with the indexes of 10 and 30 use a same HARQ entity, the carriers with the indexes of 14 and 17 separately use a HARQ entity, and the carrier with the index of 18 and the primary carrier (with an index of 0) use a same HARQ entity.

It should be noted that this embodiment may further include another implementation: The mapping relationship information may include only the carrier list and the sequence number of each carrier in the carrier list, and an activation status of the carrier configured by the base station for the terminal is not considered; and the second determining unit 1205 determines, according to the carrier list and the sequence number of each carrier, the HARQ entity corresponding to the configured carrier. A specific implementation is similar to the foregoing content, and the corresponding HARQ entity is determined by the sequence number of the carrier modulo a maximum quantity of supported HARQ entities. Details are not repeated herein.

It should be noted that this embodiment may further include another implementation: Which carriers are in the active state and which HARQ entity is used for each carrier in the active state may be alternatively indicated in the status information of the carrier or new signaling (e.g., by using a HARQ entity index, a carrier group identifier, a carrier group index, or the like). A specific implementation is similar to the foregoing content, and details are not repeated herein.

In this embodiment of the present disclosure, mapping relationship information received by a terminal includes a carrier list, and a sequence number of each carrier and status information of each carrier in the carrier list; a status of the carrier includes an active state and an inactive state; and the terminal determines, according to the carrier list, the sequence number of each carrier, and the status information of each carrier, a HARQ entity corresponding to a configured carrier. This both increases selectable carrier frequencies, and makes carrier selection more flexible and improves transmission efficiency.

In the foregoing embodiment, the terminal determines, according to the carrier list, the sequence number of each carrier, and the status information of each carrier, the HARQ entity corresponding to the configured carrier. In actual application, the terminal may alternatively determine, according to scheduling grant signaling, the HARQ entity corresponding to the configured carrier. The scheduling grant signaling is used to indicate a configured carrier used in the scheduling and a HARQ entity corresponding to the configured carrier. Details are provided in the following.

Figure 5:
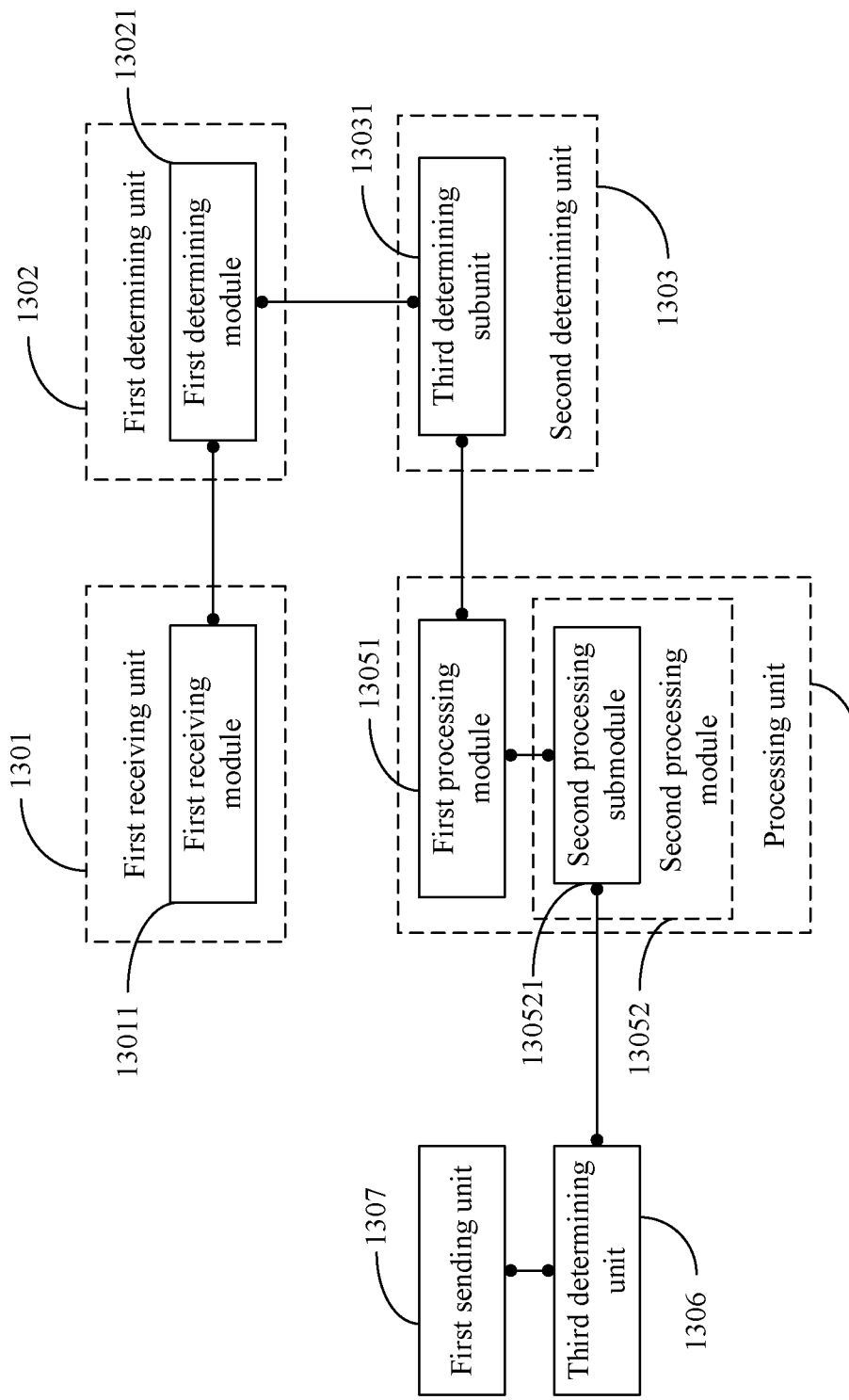
FIG. 5 is a schematic diagram of another embodiment of a data processing terminal according to the embodiments.

Referring to FIG. 5, another embodiment of the terminal includes: a first receiving unit 1301 that includes a first receiving module 13011, configured to receive, from a base station, scheduling grant signaling including a configured carrier identifier. The scheduling grant signaling further includes an indication message of a HARQ entity corresponding to a configured carrier.

Generally, each time when scheduling the terminal to send or receive data, the base station indicates to the terminal the scheduling grant signaling for the configured carrier used in the scheduling, so that the terminal can determine, according to the scheduling grant signaling, the carrier used in the scheduling, to send data. The scheduling grant signaling may further include the indication message of the HARQ entity corresponding to the configured carrier, so that the terminal can determine, according to the indication message, the HARQ entity corresponding to the configured carrier.

A first determining unit 1302 includes a first determining module 13021, configured to determine the configured carrier according to the received scheduling grant signaling that includes the configured carrier identifier and that is sent from the base station. The scheduling grant signaling further includes the indication message of the HARQ entity corresponding to the configured carrier.

The scheduling grant signaling may or may not include information about the configured carrier scheduled (e.g., a cell index). If the scheduling grant signaling includes the information about the configured carrier scheduled, the first determining module may determine, according to the information about the configured carrier, the configured carrier that the terminal needs to use. If the scheduling grant signaling does not include the information about the configured carrier scheduled, the first determining module may determine that the configured carrier required is a configured carrier used for transmitting the scheduling grant signaling.

A second determining unit 1303 includes a second determining module 13031, configured to determine, according to the indication message, the HARQ entity corresponding to the configured carrier.

The scheduling grant signaling is physical layer downlink control information, and includes a radio resource scheduled this time for uplink and/or downlink transmission, a redundancy version, and a modulation and coding scheme. In cross-carrier scheduling, the scheduling grant signaling further includes indication information of a carrier over which transmission in the scheduling is performed. In a current LTE system, a 3-bit CIF (cell index flag) is used for indication.

In this embodiment of the present disclosure, the base station may send an RRC reconfiguration message to further indicate whether the terminal uses the scheduling grant signaling including, for example, a HARQ entity index, or to indicate to a carrier whether to use the scheduling grant signaling including, for example, a HARQ entity index. It should be noted that the scheduling grant signaling including the HARQ entity index may be alternatively another physical layer downlink control information. This is not limited herein.

For example, there are eight HARQ entities, and information about the HARQ entity index (with a value 0 to 7) is included in the scheduling grant signaling to indicate which HARQ entity is used for the carrier in the scheduling. For a carrier for which no cross-carrier scheduling is configured, a scheduling grant signaling format the same as that for the cross-carrier scheduling may be used, to indicate that a 3-bit CIF field of which carrier is scheduled to indicate which HARQ entity is used to receive or send data in the scheduling. For a carrier for which the cross-carrier scheduling is configured, another field in the scheduling grant signaling or another scheduling grant signaling format needs to be used to indicate which HARQ entity is used to receive or send data in the scheduling. For a same HARQ transport block, generally, which HARQ entity is used is indicated only in scheduling grant signaling for initial transmission, and the HARQ entity used in the initial transmission is used in retransmission by default. If the retransmission and the transmission of the HARQ transport block are performed on a same carrier, scheduling grant signaling for the retransmission may not indicate which HARQ entity is used, and a same HARQ entity is used by default.

A system may agree on or configure, by using a layer 2 or layer 3, the indication information, or include the indication information in the scheduling grant signaling or in scrambling information for transmission of the scheduling grant signaling. The indication information indicates that a scheduled carrier for the scheduling grant signaling keeps using the scheduling grant signaling subsequently, or indicates a HARQ entity designated in scheduling grant signaling for most recent scheduling of the carrier, that is, subsequent scheduling grant signaling is scheduled for the scheduled carrier. If no indication information of a HARQ entity is included, the scheduling grant signaling or the HARQ entity designated in the scheduling grant signaling for the most recent scheduling of the carrier is used by default. Until agreed time expires, or a new indication including a HARQ entity is received, the scheduling grant signaling is scheduled for the scheduled carrier, or physical layer downlink control information indicating termination of use of the designated HARQ entity is included. It should be noted that a network may alternatively indicate, by using other physical layer downlink control information, which HARQ entity is used by a secondary carrier. This is not limited herein.

Some embodiments of the present disclosure further include: a processing unit 1305, a first processing module 13051 included in the processing unit 1305, a second processing module 13052 included in the processing unit 1305, a second processing submodule 130521 included in the second processing module 13052, a third determining unit 1306, and a first sending unit 1307. For specific connection relationships and functions, refer to 1006, 10061, 10062, 100621, 1007, and 1008 in the embodiment of FIG. 2.

In this embodiment of the present disclosure, a terminal receives, from a base station, scheduling grant signaling including a configured carrier identifier, where the scheduling grant signaling further includes an indication message of a HARQ entity corresponding to a configured carrier; and the terminal determines, according to the indication message included in the scheduling grant signaling, the HARQ entity corresponding to the configured carrier. This both increases selectable carrier frequencies, and makes carrier selection more flexible and improves transmission efficiency.

Figure 6:
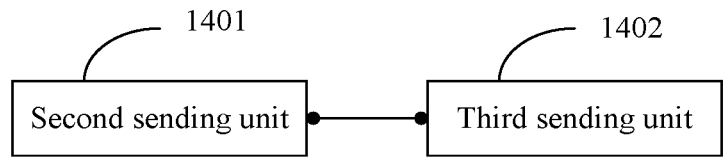
FIG. 6 is a schematic diagram of an embodiment of a data processing base station according to the embodiments.

Referring to FIG. 6, an embodiment of a base station includes: a second sending unit 1401 and a third sending unit 1402.

The second sending unit 1401 is configured to send mapping relationship information to a terminal. The mapping relationship information is used to indicate a mapping relationship between a HARQ entity of the terminal and a frequency resource configured by the base station for the terminal.

The base station determines, according to the frequency resource configured for the terminal and obtained HARQ entity resource capability information of the terminal, the mapping relationship between a HARQ entity of the terminal and a frequency resource configured by the base station for the terminal, and sends the mapping relationship information to the terminal, so that the terminal can determine, according to the mapping relationship information, a HARQ entity corresponding to a carrier.

The third sending unit 1402 is configured to send scheduling grant signaling to the terminal, so that the terminal determines a frequency resource according to the scheduling grant signaling, the terminal determines, according to the mapping relationship information, a HARQ entity corresponding to the frequency resource, and the terminal processes, by using the HARQ entity, a HARQ data block transmitted on the frequency resource.

The scheduling grant signaling may or may not include information about the scheduled frequency resource (e.g., a cell index). If the scheduling grant signaling includes the information about the scheduled frequency resource, the terminal determines, according to the frequency resource information, the frequency resource that the terminal needs to use. If the scheduling grant signaling does not include the information about the scheduled frequency resource, the terminal determines that the required frequency resource is a frequency resource used for transmitting the scheduling grant signaling.

In this embodiment of the present disclosure, when a terminal receives information that is sent from a base station and that is used to indicate a mapping relationship between a HARQ entity of the terminal and a frequency resource configured by the base station for the terminal, even if a quantity of frequency resources configured by the base station for the terminal is greater than a quantity of HARQ entities supported by the terminal, after determining a configured frequency resource, the terminal can determine, according to the mapping relationship information, a HARQ entity corresponding to the frequency resource, and process, by using the HARQ entity, a HARQ data block transmitted on the frequency resource. A HARQ entity is shared, so that during transmission of a HARQ data block with the terminal, the base station can select one or more carriers corresponding to the HARQ entity. Therefore, carrier communication channels for real-time transmission between the base station and the terminal are increased, to improve transmission efficiency. Furthermore, an opportunity is provided for the terminal to select a high-quality carrier channel, to improve transmission quality.

Figure 7:
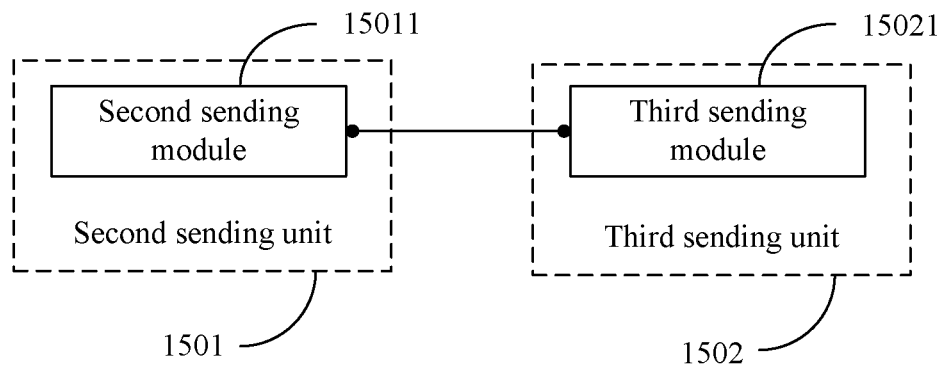
FIG. 7 is a schematic diagram of another embodiment of a data processing base station according to the embodiments.

In the foregoing embodiment, a base station sends mapping relationship information to a terminal, where the mapping relationship information is used to indicate a mapping relationship between a HARQ entity of the terminal and a frequency resource configured by the base station for the terminal; and the base station sends scheduling grant signaling to the terminal, so that the terminal determines a frequency resource according to the scheduling grant signaling, the terminal determines, according to the mapping relationship information, a HARQ entity corresponding to the frequency resource, and the terminal processes, by using the HARQ entity, a HARQ data block transmitted on the frequency resource. In actual application, the frequency resource may include a configured carrier; the mapping relationship information includes: a carrier list and a HARQ entity index or identifier corresponding to each carrier in the carrier list; or carrier group information, where a quantity of carrier groups in the carrier group information is less than or equal to a maximum quantity of HARQ entities supported by the terminal, and carriers in a same carrier group are corresponding to a same HARQ entity; or a carrier list and a sequence number of each carrier in the carrier list; or a carrier list, and a sequence number of each carrier and status information of each carrier in the carrier list, where a status of the carrier includes any one of an active state or an inactive state. The following provides detailed description. Referring to FIG. 7, another embodiment of a base station provided in the embodiments of the present disclosure includes: a second sending unit 1501 and a third sending unit 1502.

The second sending unit 1501 includes a second sending module 15011, configured to send mapping relationship information to a terminal. The mapping relationship information is used to indicate a mapping relationship between a HARQ entity of the terminal and a frequency resource configured by the base station for the terminal, and the frequency resource includes a configured carrier.

The configured carrier is a carrier configured by the base station for the terminal. It should be noted that the frequency resource may be alternatively a channel configured by the base station for the terminal. Both the carrier and the channel are expression manners of a frequency resource in wireless transmission. In addition, in a wireless transmission scenario, a carrier may be divided into multiple subchannels, and the frequency resource may be alternatively the multiple subchannels in the carrier.

Optionally, the terminal may receive, by receiving an RRC reconfiguration message sent from the base station, the mapping relationship information sent from the base station.

The third sending unit 1502 includes a third sending module 15021, configured to send scheduling grant signaling to the terminal, so that the terminal determines the configured carrier according to the scheduling grant signaling, the terminal determines, according to the mapping relationship information, a HARQ entity corresponding to the configured carrier, and the terminal processes, by using the HARQ entity, a HARQ data block transmitted on the configured carrier. The mapping relationship information includes: a carrier list and a HARQ entity index or identifier corresponding to each carrier in the carrier list; or carrier group information, where a quantity of carrier groups in the carrier group information is less than or equal to a maximum quantity of HARQ entities supported by the terminal, and carriers in a same carrier group are corresponding to a same HARQ entity; or a carrier list and a sequence number of each carrier in the carrier list; or a carrier list, and a sequence number of each carrier and status information of each carrier in the carrier list, where a status of the carrier includes any one of an active state or an inactive state.

The scheduling grant signaling may or may not include information about the configured carrier scheduled (e.g., a cell index). If the scheduling grant signaling includes the information about the configured carrier scheduled, the terminal determines, according to the information about the configured carrier, the configured carrier that the terminal needs to use. If the scheduling grant signaling does not include the information about the configured carrier scheduled, the terminal determines that the required configured carrier is a configured carrier used for transmitting the scheduling grant signaling. For detailed description on how the terminal determines the configured carrier, determines the HARQ entity corresponding to the configured carrier, and processes, by using the HARQ entity, the HARQ data block transmitted on the configured carrier, refer to the description in the embodiments of FIG. 2 to FIG. 4.

In another implementation, the scheduling grant signaling includes a configured carrier identifier and an indication message of the HARQ entity corresponding to the configured carrier, so that the terminal determines the configured carrier according to the configured carrier identifier, and determines, according to the indication message, the HARQ entity corresponding to the configured carrier. For detailed description, refer to the description in the embodiment of FIG. 5.

In this embodiment of the present disclosure, mapping relationship information sent by a base station to a terminal includes different forms of mapping relationship information between a HARQ entity of the terminal and a configured carrier configured by the base station for the terminal; after receiving a form of mapping relationship information sent from the base station, the terminal may determine a HARQ entity corresponding to the configured carrier, and may process, by using the HARQ entity, a HARQ data block transmitted on the configured carrier. In this way, even if a quantity of frequency resources configured by the base station for the terminal is greater than a quantity of HARQ entities supported by the terminal, after determining a configured frequency resource, the terminal can determine, according to the mapping relationship information, a HARQ entity corresponding to the frequency resource, and process, by using the HARQ entity, a HARQ data block transmitted on the frequency resource. A HARQ entity is shared, carrier communication channels for real-time transmission between the base station and the terminal are increased, and transmission efficiency is improved.

In the embodiments of FIG. 1 to FIG. 5, a specific structure of the terminal device is described from a perspective of a functional unit. The specific structure of the terminal device is described from a perspective of hardware in the following with reference to an embodiment of FIG. 8.

Figure 8:
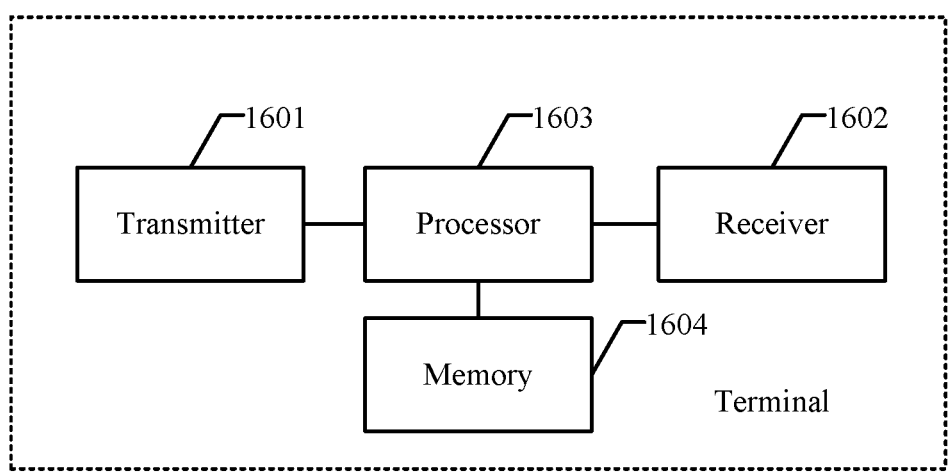
FIG. 8 is a schematic diagram of another embodiment of a data processing terminal according to the embodiments.

As shown in FIG. 8, the terminal device includes: a transmitter 1601, a receiver 1602, a processor 1603, and a memory 1604.

The terminal device may include fewer or more components than those shown in FIG. 8, and may combine two or more components, or have a different component configuration or setting. Each component may be implemented by using hardware, software, or a combination of hardware and software including one or more signal processing and/or application-specific integrated circuits.

The receiver 1602 is configured to receive mapping relationship information sent from a base station. The mapping relationship information is used to indicate a mapping relationship between a HARQ entity of the terminal and a frequency resource configured by the base station for the terminal.

The processor 1603 is configured to determine a frequency resource. After determining the frequency resource, the processor 1603 is further configured to determine, according to the mapping relationship information, a HARQ entity corresponding to the frequency resource, and process, by using the HARQ entity, a HARQ data block transmitted on the frequency resource.

In another embodiment, the frequency resource includes a configured carrier. The processor 1603 is configured to: after the receiver 1602 receives the mapping relationship information sent from the base station, when the terminal determines, according to the mapping relationship information, that a new HARQ entity is mapped to the carrier configured by the base station, perform an initialization operation on the new HARQ entity; or when the terminal determines, according to the mapping relationship information, a used HARQ entity is no longer corresponding to the carrier configured by the base station for the terminal, delete the HARQ entity corresponding to no carrier.

The mapping relationship information includes one of the following mapping relationships: a carrier list and a HARQ entity index or identifier corresponding to each carrier in the carrier list; or carrier group information, where a quantity of carrier groups in the carrier group information is less than or equal to a maximum quantity of HARQ entities supported by the terminal, and carriers in a same carrier group are corresponding to a same HARQ entity; or a carrier list and a sequence number of each carrier in the carrier list; or a carrier list, and a sequence number of each carrier and status information of each carrier in the carrier list, where a status of the carrier includes any one of an active state or an inactive state. The processor 1603 is further configured to determine, according to one mapping relationship included in the mapping relationship information, the HARQ entity corresponding to the configured carrier.

The processor 1603 is further configured to perform, by using the HARQ entity, first processing on a first HARQ data block that needs to be transmitted on the configured carrier; or the terminal performs, by using the HARQ entity, second processing on a second HARQ data block received by using the configured carrier.

The processor 1603 is further configured to: when the terminal fails to send the first HARQ data block and receives no scheduling grant signaling used for retransmitting the first HARQ data block, determine a configured retransmission carrier corresponding to the HARQ entity.

The transmitter 1601 is configured to retransmit the first HARQ data block to the base station by using the configured retransmission carrier.

In another embodiment, the scheduling grant signaling further includes an indication message of the HARQ entity corresponding to the configured carrier.

The processor 1603 is configured to determine, according to the indication message, the HARQ entity corresponding to the configured carrier.

In this embodiment of the present disclosure, when the receiver 1602 receives information that is sent from the base station and that is used to indicate a mapping relationship between a HARQ entity of the terminal and a frequency resource configured by the base station for the terminal, even if a quantity of frequency resources configured by the base station for the terminal is greater than a quantity of HARQ entities supported by the terminal, after determining a configured frequency resource, the processor 1603 can determine, according to the mapping relationship information, a HARQ entity corresponding to the frequency resource, and process, by using the HARQ entity, a HARQ data block transmitted on the frequency resource. A HARQ entity is shared, so that during transmission of a HARQ data block with the terminal, the base station can select one or more carriers corresponding to the HARQ entity. Therefore, carrier communication channels for real-time transmission between the base station and the terminal are increased, to improve transmission efficiency. Furthermore, an opportunity is provided for the terminal to select a high-quality carrier channel, to improve transmission quality.

In the embodiments of FIG. 6 and FIG. 7, a specific structure of the base station device is described from a perspective of a functional module. The specific structure of the base station device is described from a perspective of hardware in the following with reference to an embodiment of FIG. 9.

Figure 9:
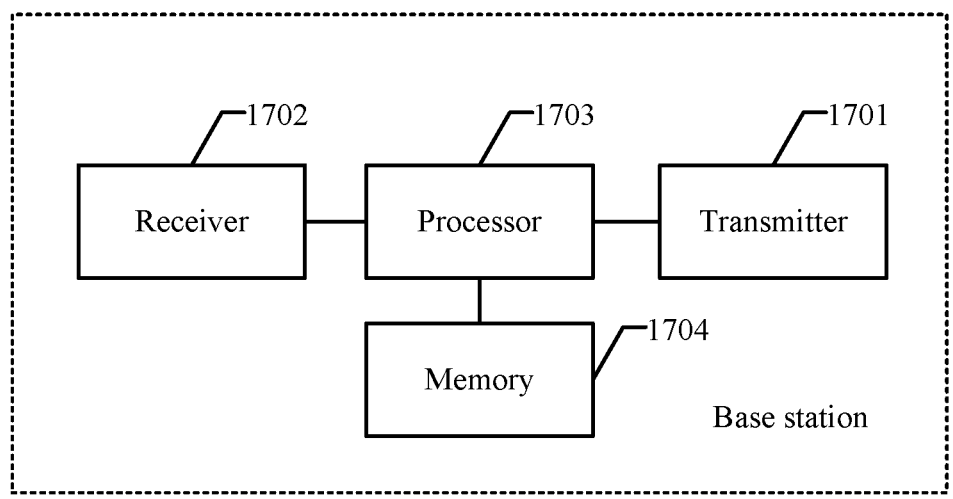
FIG. 9 is a schematic diagram of another embodiment of a data processing base station according to the embodiments.

As shown in FIG. 9, the base station device includes: a transmitter 1701, a receiver 1702, a processor 1703, and a memory 1704.

The base station device may include fewer or more components than those shown in FIG. 9, and may combine two or more components, or have a different component configuration or setting. Each component may be implemented by using hardware, software, or a combination of hardware and software including one or more signal processing and/or application-specific integrated circuits.

The transmitter 1701 is configured to send mapping relationship information to a terminal. The mapping relationship information is used to indicate a mapping relationship between a HARQ entity of the terminal and a frequency resource configured by the base station for the terminal.

The transmitter 1701 is further configured to send scheduling grant signaling to the terminal, so that the terminal determines a frequency resource according to the scheduling grant signaling, the terminal determines, according to the mapping relationship information, a HARQ entity corresponding to the frequency resource, and the terminal processes, by using the HARQ entity, a HARQ data block transmitted on the frequency resource.

In this embodiment of the present disclosure, the transmitter 1701 sends, to a terminal, mapping relationship information including a mapping relationship between a HARQ entity of the terminal and a frequency resource configured by the base station for the terminal, and sends scheduling grant signaling to the terminal, so that the terminal can determine a frequency resource according to the scheduling grant signaling, and determine, according to the mapping relationship information, a HARQ entity corresponding to the frequency resource. A HARQ entity is shared, so that during transmission of a HARQ data block with the terminal, the base station can select one or more carriers corresponding to the HARQ entity. Therefore, carrier communication channels for real-time transmission between the base station and the terminal are increased, to improve transmission efficiency. Furthermore, an opportunity is provided for the terminal to select a high-quality carrier channel, to improve transmission quality.

For example, in a specific example, the terminal is a UE, the base station is an eNB, a maximum of eight HARQ entities are supported by the UE, indexes of the HARQ entities are 0 to 7, the frequency resource includes 32 carriers configured by the eNB for the UE, and the mapping relationship information includes a carrier list and a HARQ entity index corresponding to each carrier in the carrier list.

Figure 10:
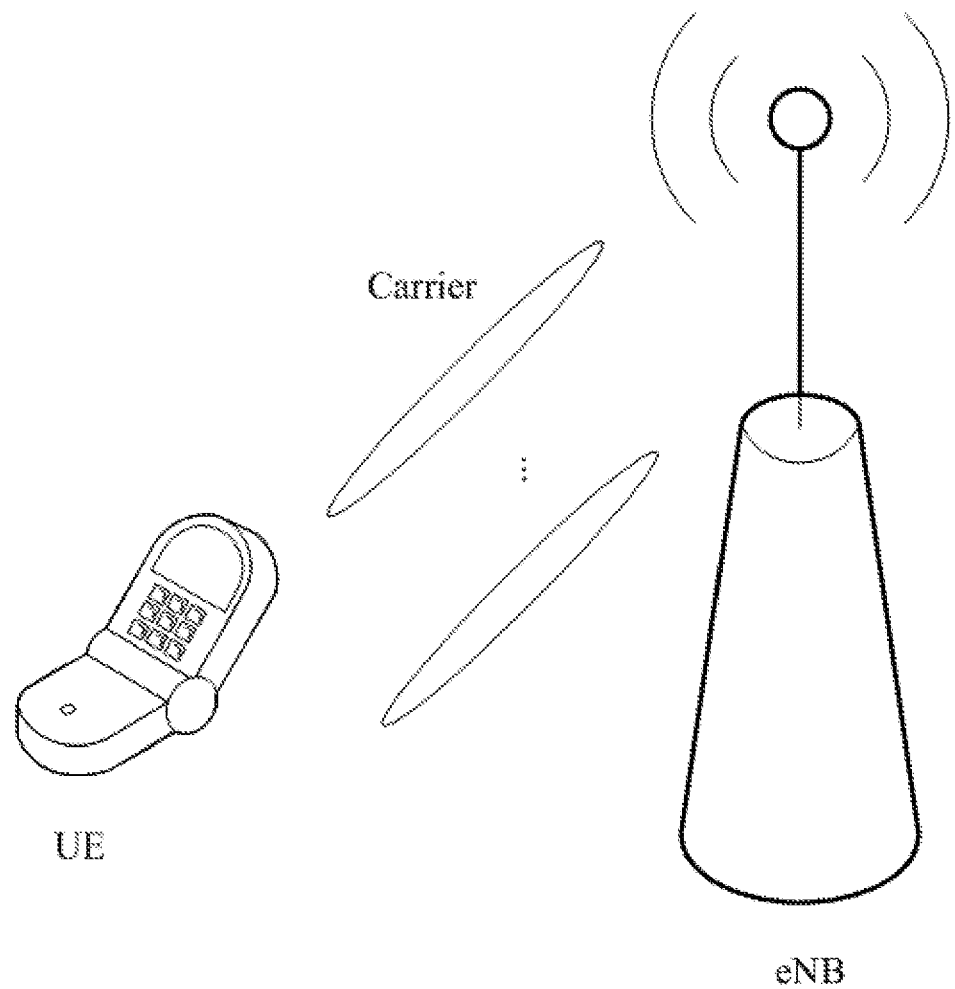
FIG. 10 is a schematic diagram of an embodiment of a data processing application scenario according to the embodiments.

Referring to FIG. 10, an embodiment of a specific application scenario of a data processing device includes: the UE receives the mapping relationship information sent from the eNB. In the mapping relationship, a HARQ entity 2 is a new HARQ entity mapped to a carrier configured by the eNB. The UE performs an initialization operation on the HARQ entity 2, so that a current use quantity of the HARQ entity 2 is 0. The UE receives the scheduling grant signaling that instructs to use a carrier 5 in the scheduling and that is sent from the eNB, and in the mapping relationship, the carrier 5 is corresponding to an index 1 of the HARQ entity 2. The UE determines that the carrier 5 and the HARQ entity 2 are used in the scheduling. The UE generates a first HARQ data block on the HARQ entity 2, and the UE transmits the first HARQ data block to the eNB by using the carrier 5. When failing to send the first HARQ data block and receiving no scheduling grant signaling that is used to indicate retransmission of the first HARQ data block and that is sent from the eNB, the UE selects a carrier 6 corresponding to the HARQ entity 2 to retransmit the first HARQ data block. When receiving, by using the HARQ entity 2, second HARQ data blocks sent from the eNB by using the carrier 5 and the carrier 6, the UE performs, by using the HARQ entity 2, combined decoding and data decoding on the second HARQ data blocks.

Figure 11:
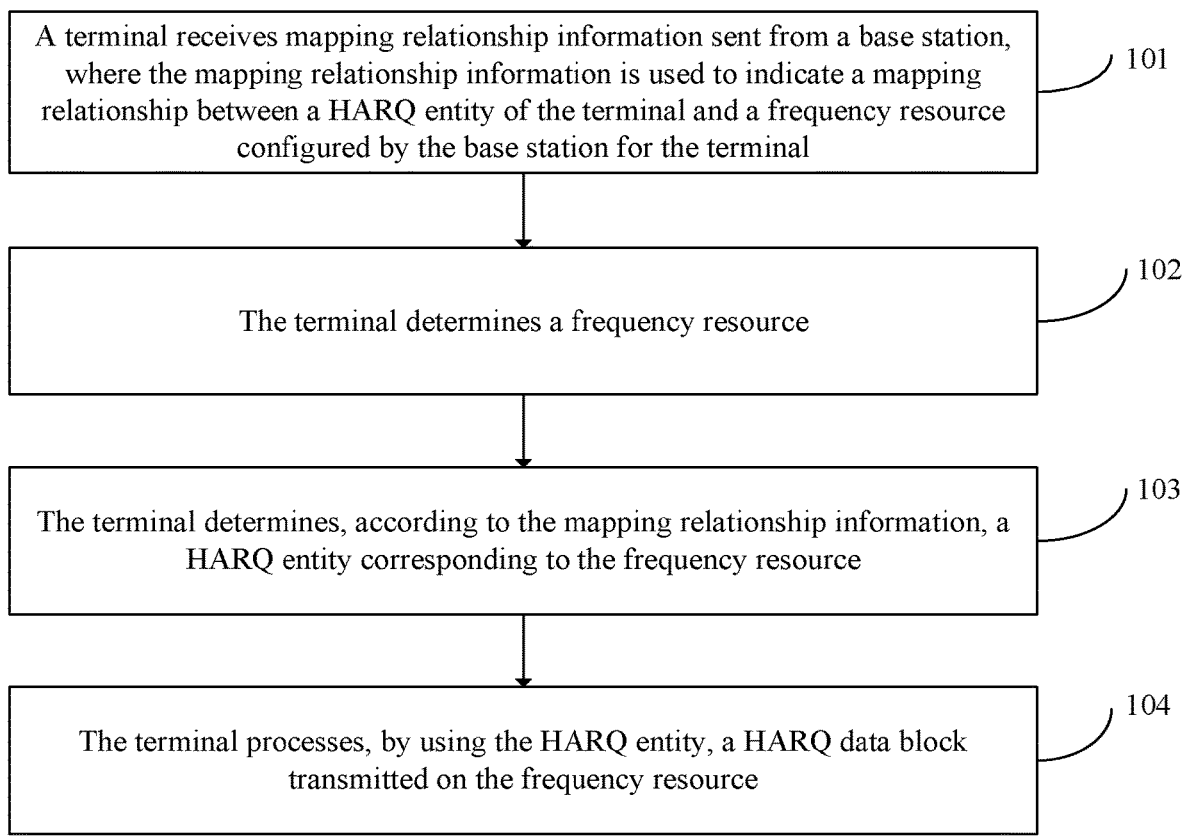
FIG. 11 is a schematic diagram of an embodiment of a data processing method according to the embodiments.

Referring to FIG. 11, an embodiment of the data processing method includes the following steps.

101. A terminal receives mapping relationship information sent from a base station, where the mapping relationship information is used to indicate a mapping relationship between a HARQ entity of the terminal and a frequency resource configured by the base station for the terminal.

Before the base station sends the mapping relationship information to the terminal, the base station first obtains hybrid automatic repeat request HARQ entity resource capability information of the terminal. In all the embodiments of the present disclosure, the HARQ entity resource capability information may include information about a maximum quantity of HARQ entities supported by the terminal.

In embodiments of the present disclosure, the base station may obtain the HARQ entity resource capability information of the terminal in the following manners: The terminal reports the HARQ entity resource capability information of the terminal to the base station in a process of connecting to a network or after connecting to a network; when the terminal is handed over or establishes a connection to a new base station, the new base station may obtain, in a handover preparation process, the HARQ entity resource capability information of the terminal from a base station that the terminal is previously connected to; the base station may alternatively obtain the HARQ entity resource capability information of the terminal by using an MME; or the base station stores the HARQ entity resource capability information of the terminal; or the base station determines the HARQ entity resource capability information of the terminal according to protocol specifications. The base station determines, according to the frequency resource configured for the terminal and the obtained HARQ entity resource capability information of the terminal, the mapping relationship between a HARQ entity of the terminal and a frequency resource configured by the base station for the terminal, and sends the mapping relationship information to the terminal, so that the terminal can determine, according to the mapping relationship information, a HARQ entity corresponding to a carrier.

102. The terminal determines a frequency resource.

Generally, each time when scheduling the terminal to send or receive data, the base station indicates to the terminal scheduling grant signaling for the frequency resource used in the scheduling, so that the terminal can determine, according to the scheduling grant signaling, the frequency resource used in the scheduling, to send data. The scheduling grant signaling may or may not include information about the scheduled frequency resource (e.g., a cell index). If the scheduling grant signaling includes the information about the scheduled frequency resource, the terminal determines, according to the frequency resource information, the frequency resource that the terminal needs to use. If the scheduling grant signaling does not include the information about the scheduled frequency resource, the terminal determines that the required frequency resource is a frequency resource used for transmitting the scheduling grant signaling.

103. The terminal determines, according to the mapping relationship information, a HARQ entity corresponding to the frequency resource.

After receiving the scheduling grant signaling, the terminal may determine, according to the mapping relationship information, the HARQ entity corresponding to the frequency resource, so that the base station and the terminal implement transmission of a HARQ data block.

104. The terminal processes, by using the HARQ entity, a HARQ data block transmitted on the frequency resource.

After determining the frequency resource and the corresponding HARQ entity, the terminal processes, by using the HARQ entity, the HARQ data block transmitted on the frequency resource, that is, processes a HARQ data block that needs to be transmitted on the frequency resource, and processes a HARQ data block received by using the frequency resource.

In this embodiment of the present disclosure, when a terminal receives information that is sent from a base station and that is used to indicate a mapping relationship between a HARQ entity of the terminal and a frequency resource configured by the base station for the terminal, even if a quantity of frequency resources configured by the base station for the terminal is greater than a quantity of HARQ entities supported by the terminal, after determining a configured frequency resource, the terminal can determine, according to the mapping relationship information, a HARQ entity corresponding to the frequency resource, and process, by using the HARQ entity, a HARQ data block transmitted on the frequency resource. A HARQ entity is shared, so that during transmission of a HARQ data block with the terminal, the base station can select one or more carriers corresponding to the HARQ entity. Therefore, carrier communication channels for real-time transmission between the base station and the terminal are increased, to improve transmission efficiency. Furthermore, an opportunity is provided for the terminal to select a high-quality carrier channel, to improve transmission quality.

In the foregoing embodiment, a terminal receives mapping relationship information sent from a base station, where the mapping relationship information is used to indicate a mapping relationship between a HARQ entity of the terminal and a frequency resource configured by the base station for the terminal; the terminal determines a frequency resource, and the terminal determines, according to the mapping relationship information, a HARQ entity corresponding to the frequency resource; and the terminal processes, by using the HARQ entity, a HARQ data block transmitted on the frequency resource. In actual application, the frequency resource may include a configured carrier; the mapping relationship information may include a carrier list and a HARQ entity index or identifier corresponding to each carrier in the carrier list. When failing to send the HARQ data block and receiving no scheduling grant signaling used for retransmitting the HARQ data block, the terminal determines a retransmission frequency resource corresponding to the HARQ entity to retransmit the HARQ data block. After the terminal receives the mapping relationship information sent from the base station, the method further includes: when determining, according to the mapping relationship information, that a new HARQ entity is mapped to the frequency resource configured by the base station, performing an initialization operation on the new HARQ entity; or when determining, according to the mapping relationship information, that a used HARQ entity is no longer corresponding to any frequency resource, deleting the HARQ entity corresponding to no frequency resource. The following provides detailed description.

Figure 12:
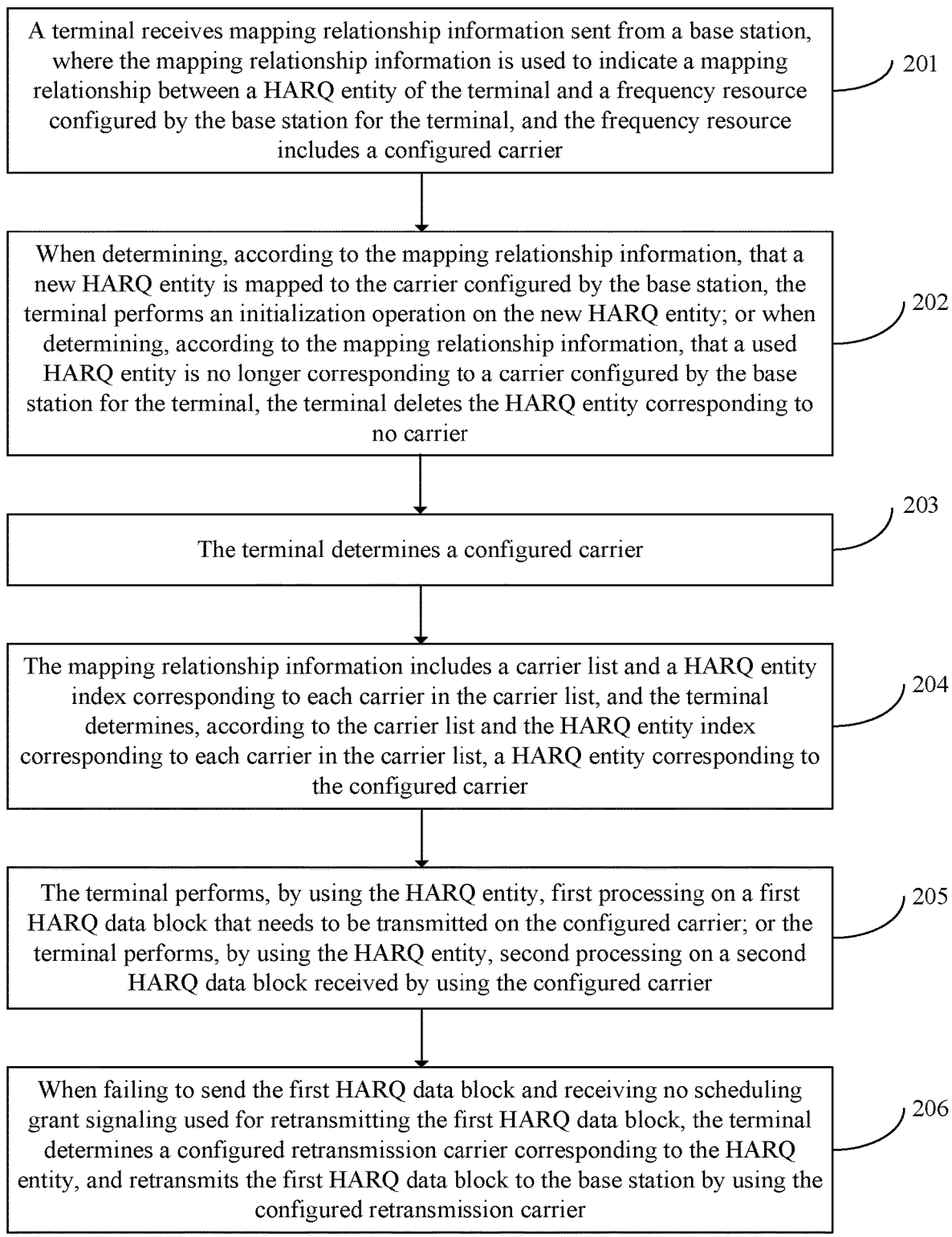
FIG. 12 is a schematic diagram of another embodiment of a data processing method according to the embodiments.

Referring to FIG. 12, another embodiment of the data processing method includes the following steps.

201. A terminal receives mapping relationship information sent from a base station, where the mapping relationship information is used to indicate a mapping relationship between a HARQ entity of the terminal and a frequency resource configured by the base station for the terminal, and the frequency resource includes a configured carrier.

The configured carrier is a carrier configured by the base station for the terminal. It should be noted that the frequency resource may be alternatively a channel configured by the base station for the terminal. Both the carrier and the channel are expression manners of a frequency resource in wireless transmission. In addition, in a wireless transmission scenario, a carrier may be divided into multiple subchannels, and the frequency resource may be alternatively the multiple subchannels in the carrier.

Optionally, the terminal may receive, by receiving an RRC reconfiguration message sent from the base station, the mapping relationship information sent from the base station.

202. When determining, according to the mapping relationship information, that a new HARQ entity is mapped to the carrier configured by the base station, the terminal performs an initialization operation on the new HARQ entity; or when determining, according to the mapping relationship information, that a used HARQ entity is no longer corresponding to a carrier configured by the base station for the terminal, the terminal deletes the HARQ entity corresponding to no carrier.

The terminal receives the mapping relationship information between a carrier configured by the base station for the terminal and a HARQ entity. When determining, according to the mapping relationship information, that the new HARQ entity is mapped to the carrier configured by the base station, the terminal performs the initialization operation on the new HARQ entity, for example, initializes a CURRENT_TX_NB of each HARQ process to 0. When determining, according to the mapping relationship information, that the used HARQ entity is no longer corresponding to any carrier, the terminal deletes the corresponding HARQ entity, to improve resource utilization.

Optionally, if the terminal receives the mapping relationship message by receiving the RRC reconfiguration message sent from the base station, the terminal may further return an RRC reconfiguration complete message to the base station.

203. The terminal determines a configured carrier.

Generally, each time when scheduling the terminal to send or receive data, the base station indicates to the terminal scheduling grant signaling for the configured carrier used in the scheduling, so that the terminal can determine, according to the scheduling grant signaling, the carrier used in the scheduling, to send data. The scheduling grant signaling may or may not include information about the configured carrier scheduled (for example, a cell index). If the scheduling grant signaling includes the information about the configured carrier scheduled, the terminal determines, according to information about the configured carrier, the configured carrier that the terminal needs to use. If the scheduling grant signaling does not include the information about the configured carrier scheduled, the terminal determines that the required configured carrier is a configured carrier used for transmitting the scheduling grant signaling.

204. The mapping relationship information includes a carrier list and a HARQ entity index corresponding to each carrier in the carrier list, and the terminal determines, according to the carrier list and the HARQ entity index corresponding to each carrier in the carrier list, a HARQ entity corresponding to the configured carrier.

After receiving the scheduling grant signaling, the terminal may determine, according to the mapping relationship information, the HARQ entity corresponding to the configured carrier, so that the base station and the terminal implement transmission of a HARQ data block. Optionally, the mapping relationship information includes the carrier list and the HARQ entity index corresponding to each carrier. The terminal determines, according to the carrier list and the HARQ entity index corresponding to each carrier, the HARQ entity corresponding to the configured carrier. For example, there are eight HARQ entities of the terminal and 32 carriers configured by the base station for the terminal; the mapping relationship information includes a carrier list of the 32 carriers and a HARQ entity index (whose value range is 0-7) corresponding to each carrier; and in this embodiment, a HARQ entity whose index value is 0 may be constantly used for a primary carrier. In this case, after the determining the configured carrier according to the scheduling grant signaling, the terminal determines a HARQ entity (e.g., the fourth HARQ entity) according to a HARQ entity index (e.g., an index value of 3) corresponding to the configured carrier, and processes, in the determined HARQ entity, a HARQ data block in this scheduling.

It should be noted that the mapping relationship information may alternatively include a carrier list and a HARQ entity identifier corresponding to each carrier. The terminal determines, according to the carrier list and the HARQ entity identifier corresponding to each carrier, the HARQ entity corresponding to the configured carrier. A specific implementation is similar to the foregoing content, and details are not repeated herein.

205. The terminal performs, by using the HARQ entity, first processing on a first HARQ data block that needs to be transmitted on the configured carrier; or the terminal performs, by using the HARQ entity, second processing on a second HARQ data block received by using the configured carrier.

In an uplink direction, after determining the configured carrier and the corresponding HARQ entity, the terminal performs the first processing on the first HARQ data block by using the HARQ entity. The first processing includes generating the first HARQ data block, performing redundancy version update processing on the retransmitted first HARQ data block, or the like. The first HARQ data block that undergoes the first processing may be sent to the base station by using the configured carrier.

In a downlink direction, after determining the configured carrier and the corresponding HARQ entity, the terminal receives the second HARQ data block by using the configured carrier, and performs the second processing on the second HARQ data block by using the HARQ entity, so that the terminal can parse the second HARQ data block. If the second HARQ data block is a retransmitted data block, no matter whether the carrier used for transmitting the retransmitted data block is the same as a carrier used for a previous transmission (initial transmission or retransmission) of the second HARQ data block, provided that all these carriers used for transmitting the second HARQ data block are corresponding to a HARQ entity, a HARQ entity is selected according to the mapping relationship information, to perform data decoding on the second HARQ data block. If the data decoding fails, combined decoding is further performed on the received second HARQ data block and content of the second HARQ data block in a receive buffer, to improve a decoding success rate. Optionally, the terminal may further temporarily save the second HARQ data block after the second HARQ data block fails to be decoded.

206. When failing to send the first HARQ data block and receiving no scheduling grant signaling used for retransmitting the first HARQ data block, the terminal determines a configured retransmission carrier corresponding to the HARQ entity, and retransmits the first HARQ data block to the base station by using the configured retransmission carrier.

After the terminal transmits a HARQ data block on the configured carrier determined, if the HARQ data block fails to be transmitted, the terminal may receive scheduling information, sent from the base station to the terminal, for retransmission of the HARQ data block. The terminal may be scheduled by the base station to retransmit the HARQ data block over another carrier that uses the same HARQ entity as the previously used carrier. In this case, except for using the another carrier to perform HARQ retransmission, processing performed by the terminal on the HARQ data block, such as a redundancy version calculation rule and HARQ retransmission moment calculation, is the same as retransmission processing performed on the previously selected carrier.

Generally, the base station supports non-adaptive HARQ retransmission in the uplink direction, that is, after the terminal receives from the base station a feedback that an uplink HARQ data block fails to be transmitted, and when the terminal receives no scheduling information from the base station for retransmitting the HARQ data block, the terminal may retransmit, on a previously scheduled resource at a next retransmission moment according to an agreed redundancy version calculation rule and HARQ retransmission moment calculation rule, the HARQ data block in a redundancy version that is obtained according to the calculation rule. When multiple carriers are mapped to a same HARQ entity, the base station may further designate or agree on in a protocol a non-adaptive retransmission order of the uplink HARQ data block over the carriers. For example, carriers A, B, and C are mapped to a same HARQ entity, the base station designates a non-adaptive transmission order of the uplink HARQ data block over the three carriers: cyclically on A, B, and C, and a redundancy version generation rule is in an order of 0, 2, 3, and 1 cyclically. It is assumed that the uplink HARQ data block in the redundancy version 1 fails to be transmitted over the carrier B, and the terminal receives no scheduling information for the data block at a next retransmission moment from the base station, the terminal retransmits, by using the previously scheduled resource, the HARQ data block in the redundancy version 0 over the carrier C at the next retransmission moment. In this way, initial transmission and each retransmission of a same HARQ data block are not confined to a same carrier, and a carrier with a best radio channel at that time may be selected for transmission.

In this embodiment of the present disclosure, when a terminal determines, according to mapping relationship information, that a new HARQ entity is mapped to a carrier configured by a base station, the terminal performs an initialization operation on the new HARQ entity, so as to ensure accuracy for HARQ data block transmission. When determining, according to the mapping relationship information, that a used HARQ entity is no longer corresponding to any carrier, the terminal deletes the HARQ entity corresponding to no carrier, so as to reduce waste of a HARQ entity resource. The terminal determines, according to a carrier list and a HARQ entity index corresponding to each carrier in the carrier list, a HARQ entity corresponding to a configured carrier, so that a HARQ entity is mapped to multiple carriers by using the carrier list and the HARQ entity index, selectable frequencies are increased, and transmission quality is improved. When failing to send a first HARQ data block and receiving no scheduling grant signaling, the terminal determines a configured retransmission carrier corresponding to the HARQ entity, and retransmits the first HARQ data block to the base station by using the configured retransmission carrier, so that a different carrier is selected for retransmission, and a transmission success rate is increased. When the terminal receives a second HARQ data block sent from the base station, if the second HARQ data blocks are HARQ data blocks sent from the base station by using different carriers, the terminal selects, according to the mapping relationship information, a corresponding HARQ entity to perform combined decoding and data decoding on the second HARQ data blocks; or if the second HARQ data blocks are HARQ data blocks sent from the base station by using a same carrier, the terminal selects, according to the mapping relationship information, a corresponding HARQ entity to perform data decoding on the second HARQ data blocks. This implements combined decoding on a HARQ entity and improves transmission quality.

In the foregoing embodiment, the terminal determines, according to the carrier list and the HARQ entity index corresponding to each carrier, the HARQ entity corresponding to the configured carrier. In actual application, the terminal may alternatively determine, according to carrier group information, the HARQ entity corresponding to the configured carrier, and details are provided in the following.

Figure 13:
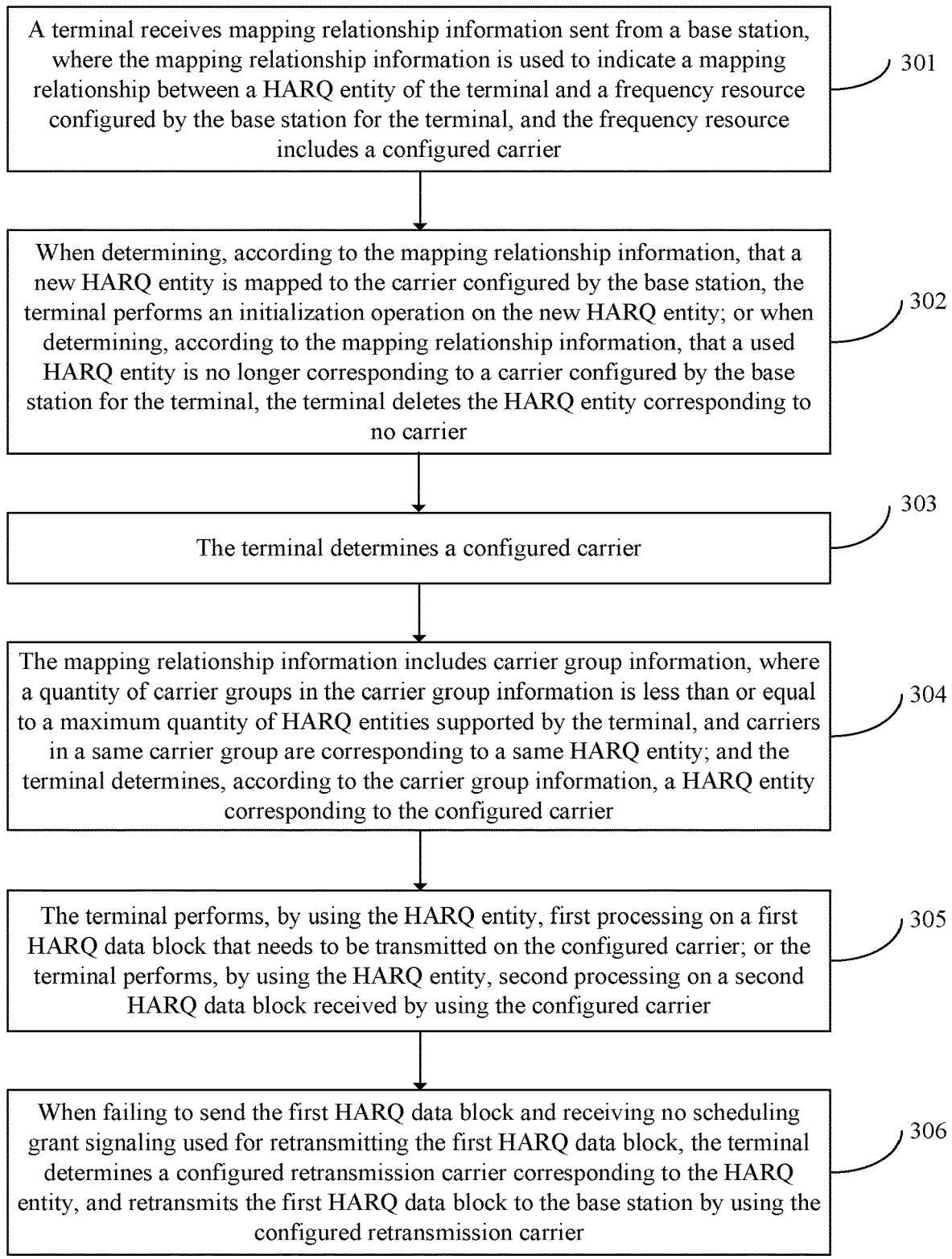
FIG. 13 is a schematic diagram of another embodiment of a data processing method according to the embodiments.

Referring to FIG. 13, another embodiment of the data processing method includes the following steps. For specific steps 301 to 303, refer to steps 201 to 203 in FIG. 12 in the foregoing embodiment.

304. The mapping relationship information includes carrier group information, where a quantity of carrier groups in the carrier group information is less than or equal to a maximum quantity of HARQ entities supported by the terminal, and carriers in a same carrier group are corresponding to a same HARQ entity; and the terminal determines, according to the carrier group information, a HARQ entity corresponding to the configured carrier.

If there are eight HARQ entities, the quantity of carrier groups included in the carrier group information is less than or equal to eight. The terminal considers by default that different carrier groups use different HARQ entities, respectively. The terminal determines which specific carrier group is corresponding to a HARQ entity, provided that the different carrier groups use the different HARQ entities. For example, there are eight HARQ entities of the terminal and 32 carriers configured by the base station for the terminal; eight groups of group information of the 32 carriers are included in the mapping relationship information, and each group includes four carriers. In this case, after determining the configured carrier (e.g., a carrier in a group 2), the terminal determines the corresponding HARQ entity (e.g., the first HARQ entity according to a decision of the terminal) according to a group to which the configured carrier belongs (e.g., the group 2).

For specific steps 305 and 306, refer to steps 205 and 206 in FIG. 12 in the foregoing embodiment.

In this embodiment of the present disclosure, mapping relationship information received by the terminal includes carrier group information; a quantity of carrier groups in the carrier group information is less than or equal to a maximum quantity of HARQ entities supported by the terminal, and carriers in a same carrier group are corresponding to a same HARQ entity; and the terminal determines, according to the carrier group information, a HARQ corresponding to a configured carrier. This both increases selectable carrier frequencies, and reduces signaling overheads.

In the foregoing embodiment, the terminal determines, according to the carrier group information, the HARQ entity corresponding to the configured carrier. In actual application, the terminal may alternatively determine, according to a carrier list, a sequence number of each carrier, and status information of each carrier, the HARQ entity corresponding to the configured carrier, and details are provided in the following.

Figure 14:
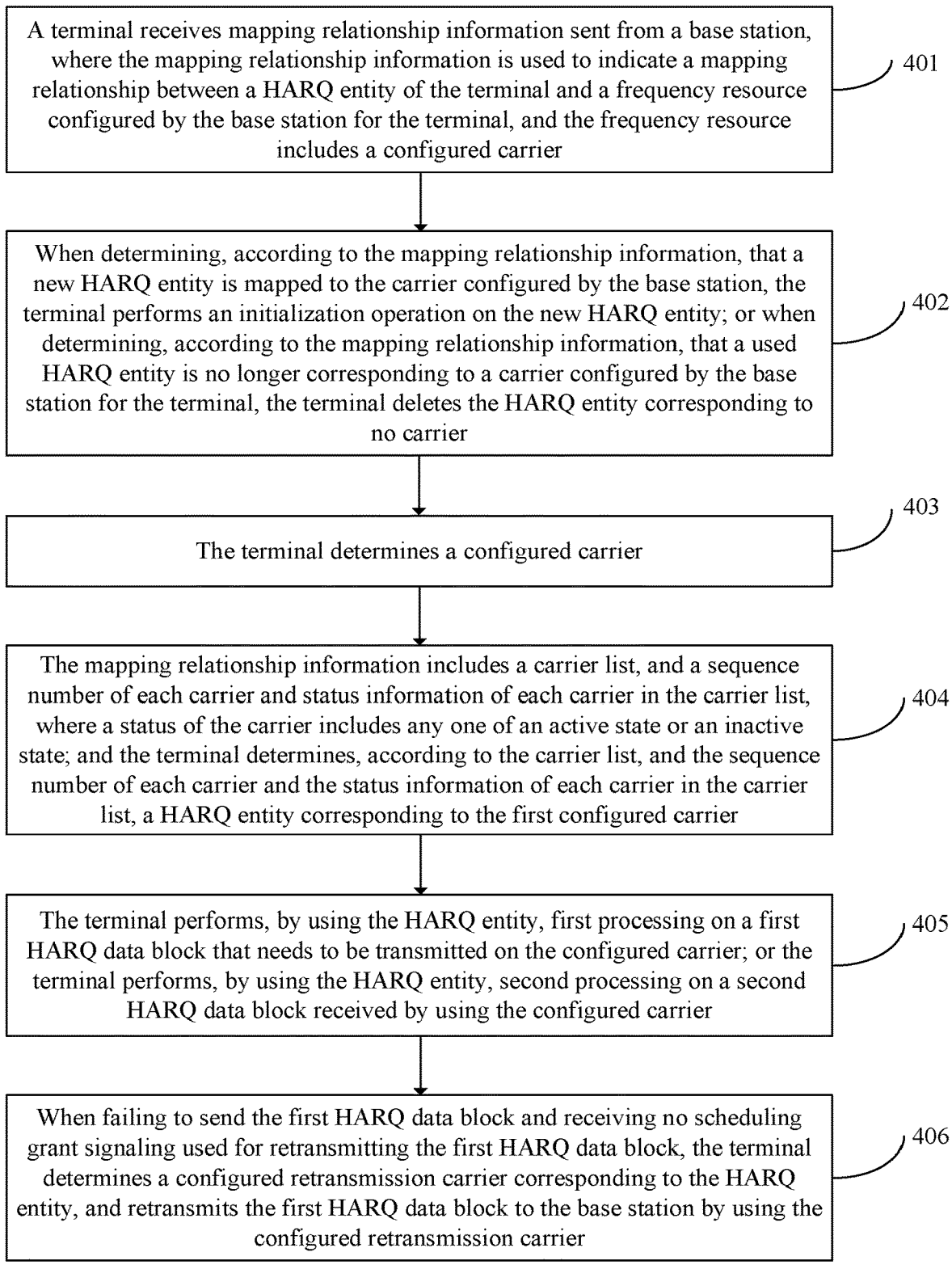
FIG. 14 is a schematic diagram of another embodiment of a data processing method according to the embodiments.

Referring to FIG. 14, another embodiment of the data processing method includes the following steps. For specific steps 401 to 403, refer to steps 201 to 203 in FIG. 12 in the foregoing embodiment.

404. The mapping relationship information includes a carrier list, and a sequence number of each carrier and status information of each carrier in the carrier list, where a status of the carrier includes any one of an active state or an inactive state; and the terminal determines, according to the carrier list, and the sequence number of each carrier and the status information of each carrier in the carrier list, a HARQ entity corresponding to the configured carrier.

If there are 32 carriers configured by the base station for the terminal, the status information of the carrier may indicate, by using a 32-bit bitmap, statuses (e.g., the active state or the inactive state) of the 32 configured carriers. The $n^{th}$ (counting from 0) bit in the bitmap being 1 indicates that a configured carrier with an index of n is in the active state. Specifically, if an active carrier ranks number n (counting from 0 or 1, and in this example, counting from 1) among all active carriers indicated in the status information bitmap, all active carriers with a same value obtained from n mod 8 use a same HARQ entity. For example, the bitmap of the active/inactive state in the status information of the carrier is as follows. Except for a primary carrier, 13 secondary carriers with indexes of 4, 6, 7, 8, 10, 14, 17, 18, 20, 23, 26, 29, and 30 are in the active state, and they are ranked the first to the thirteenth among all active carriers. Therefore, the carriers with the indexes of 4 and 20 use a same HARQ entity, the carriers with the indexes of 6 and 23 use a same HARQ entity, the carriers with the indexes of 7 and 26 use a same HARQ entity, the carriers with the indexes of 8 and 29 use a same HARQ entity, the carriers with the indexes of 10 and 30 use a same HARQ entity, the carriers with the indexes of 14 and 17 separately use a HARQ entity, and the carrier with the index of 18 and the primary carrier (with an index of 0) use a same HARQ entity.

It should be noted that this embodiment may further include another implementation: The mapping relationship information may include only the carrier list and the sequence number of each carrier in the carrier list, and an activation status of the carrier configured by the base station for the terminal is not considered; and the terminal determines, according to the carrier list and the sequence number of each carrier, the HARQ entity corresponding to the configured carrier. A specific implementation is similar to the foregoing content, and the corresponding HARQ entity is determined by the sequence number of the carrier modulo a maximum quantity of supported HARQ entities. Details are not repeated herein.

It should be noted that this embodiment may further include another implementation: Which carriers are in the active state and which HARQ entity is used for each carrier in the active state may be alternatively indicated in the status information of the carrier or new signaling (e.g., by using a HARQ entity index, a carrier group identifier, a carrier group index, or the like). A specific implementation is similar to the foregoing content, and details are not repeated herein.

For specific steps 405 and 406, refer to steps 205 and 206 in FIG. 12 in the foregoing embodiment.

In this embodiment of the present disclosure, mapping relationship information received by a terminal includes a carrier list, and a sequence number of each carrier and status information of each carrier in the carrier list; a status of the carrier includes an active state and an inactive state; and the terminal determines, according to the carrier list, the sequence number of each carrier, and the status information of each carrier, a HARQ entity corresponding to a configured carrier. This both increases selectable carrier frequencies, and makes carrier selection more flexible and improves transmission efficiency.

In the foregoing embodiment, the terminal determines, according to the carrier list, the sequence number of each carrier, and the status information of each carrier, the HARQ entity corresponding to the configured carrier. In actual application, the terminal may alternatively determine, according to scheduling grant signaling, the HARQ entity corresponding to the configured carrier. The scheduling grant signaling is used to indicate a configured carrier used in the scheduling and a HARQ entity corresponding to the configured carrier. Details are provided in the following.

Figure 15:
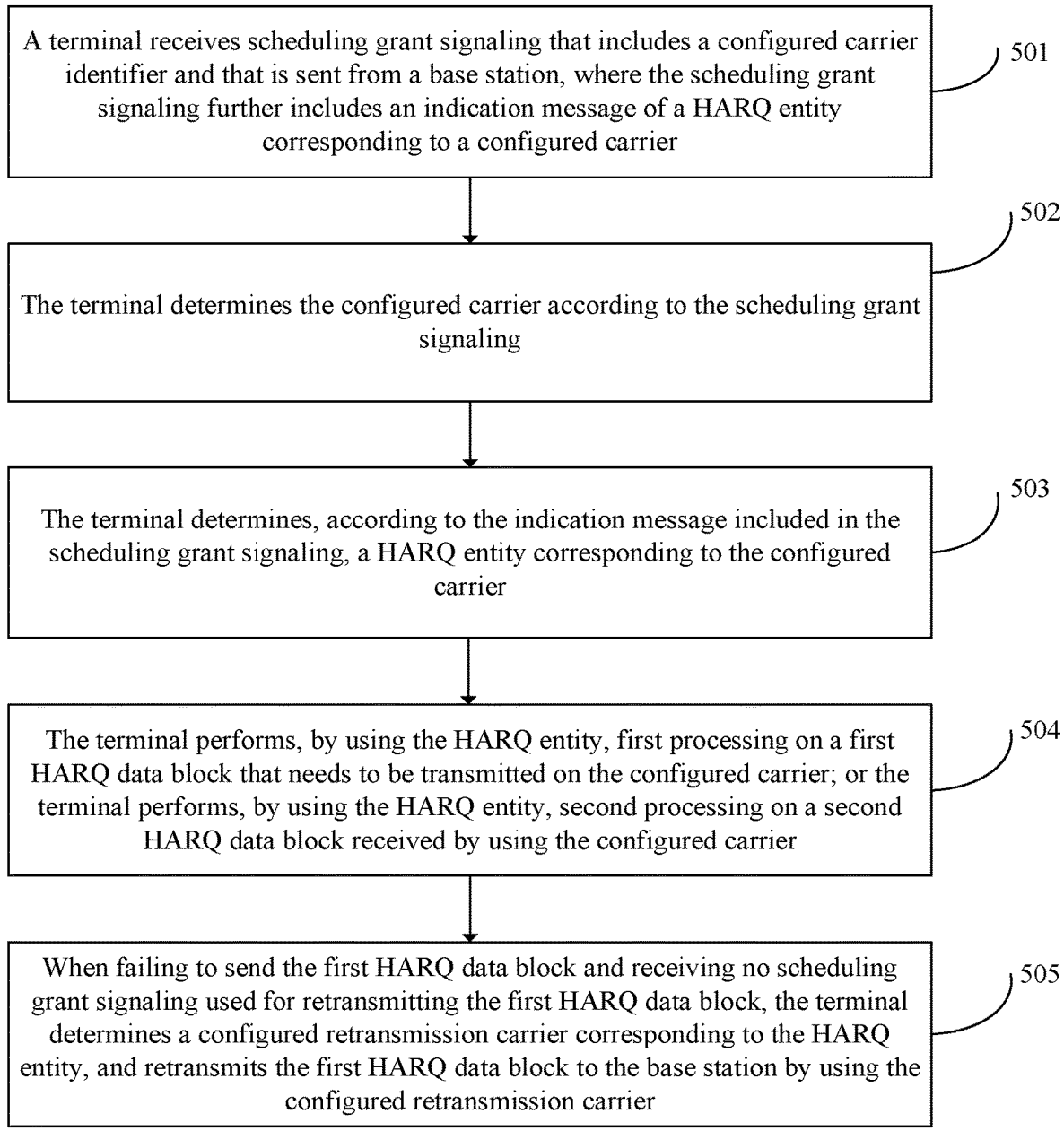
FIG. 15 is a schematic diagram of another embodiment of a data processing method according to the embodiments.

Referring to FIG. 15, another embodiment of the data processing method includes the following steps.

501. A terminal receives scheduling grant signaling that includes a configured carrier identifier and that is sent from a base station, where the scheduling grant signaling further includes an indication message of a HARQ entity corresponding to a configured carrier.

Generally, each time when scheduling the terminal to send or receive data, the base station indicates to the terminal the scheduling grant signaling for the configured carrier used in the scheduling, so that the terminal can determine, according to the scheduling grant signaling, the carrier used in the scheduling, to send data. The scheduling grant signaling may further include the indication message of the HARQ entity corresponding to the configured carrier, so that the terminal can determine, according to the indication message, the HARQ entity corresponding to the configured carrier.

502. The terminal determines the configured carrier according to the scheduling grant signaling.

The scheduling grant signaling may or may not include information about the configured carrier scheduled (for example, a cell index). If the scheduling grant signaling includes the information about the configured carrier scheduled, the terminal determines, according to information about the configured carrier, the configured carrier that the terminal needs to use. If the scheduling grant signaling does not include the information about the configured carrier scheduled, the terminal determines that the required configured carrier is a configured carrier used for transmitting the scheduling grant signaling.

503. The terminal determines, according to the indication message included in the scheduling grant signaling, a HARQ entity corresponding to the configured carrier.

The scheduling grant signaling is physical layer downlink control information, and includes a radio resource scheduled this time for uplink and/or downlink transmission, a redundancy version, and a modulation and coding scheme. In cross-carrier scheduling, the scheduling grant signaling further includes indication information of a carrier over which transmission in the scheduling is performed. In a current LTE system, a 3-bit CIF is used for indication.

In this embodiment of the present disclosure, the base station may send an RRC reconfiguration message to further indicate whether the terminal uses the scheduling grant signaling including, for example, a HARQ entity index, or to indicate to a carrier whether to use the scheduling grant signaling including, for example, a HARQ entity index. It should be noted that the scheduling grant signaling including the HARQ entity index may be alternatively another physical layer downlink control information. This is not limited herein.

For example, there are eight HARQ entities, and information about the HARQ entity index (with a value 0 to 7) is included in the scheduling grant signaling to indicate which HARQ entity is used for the carrier in the scheduling. For a carrier for which no cross-carrier scheduling is configured, a scheduling grant signaling format the same as that for the cross-carrier scheduling may be used, to indicate that a 3-bit CIF field of which carrier is scheduled to indicate which HARQ entity is used to receive or send data in the scheduling. For a carrier for which the cross-carrier scheduling is configured, another field in the scheduling grant signaling or another scheduling grant signaling format needs to be used to indicate which HARQ entity is used to receive or send data in the scheduling. For a same HARQ transport block, generally, which HARQ entity is used is indicated only in scheduling grant signaling for initial transmission, and the HARQ entity used in the initial transmission is used in retransmission by default. If the retransmission and the transmission of the HARQ transport block are performed on a same carrier, scheduling grant signaling for the retransmission may not indicate which HARQ entity is used, and a same HARQ entity is used by default.

A system may agree on or configure, by using a layer 2 or layer 3, the indication information, or include the indication information in the scheduling grant signaling or in scrambling information for transmission of the scheduling grant signaling. The indication information indicates that a scheduled carrier for the scheduling grant signaling keeps using the scheduling grant signaling subsequently, or indicates a HARQ entity designated in scheduling grant signaling for most recent scheduling of the carrier, that is, subsequent scheduling grant signaling is scheduled for the scheduled carrier. If no indication information of a HARQ entity is included, the scheduling grant signaling or the HARQ entity designated in the scheduling grant signaling for the most recent scheduling of the carrier is used by default. Until agreed time expires, or a new indication including a HARQ entity is received, the scheduling grant signaling is scheduled for the scheduled carrier, or physical layer downlink control information indicating termination of use of the designated HARQ entity is included. It should be noted that a network may alternatively indicate, by using other physical layer downlink control information, which HARQ entity is used by a secondary carrier. This is not limited herein.

For specific steps 504 and 505, refer to steps 205 and 206 in FIG. 12 in the foregoing embodiment.

In this embodiment of the present disclosure, a terminal receives, from a base station, scheduling grant signaling including a configured carrier identifier, where the scheduling grant signaling further includes an indication message of a HARQ entity corresponding to a configured carrier; and the terminal determines, according to the indication message included in the scheduling grant signaling, the HARQ entity corresponding to the configured carrier. This both increases selectable carrier frequencies, and makes carrier selection more flexible and improves transmission efficiency.

Figure 16:
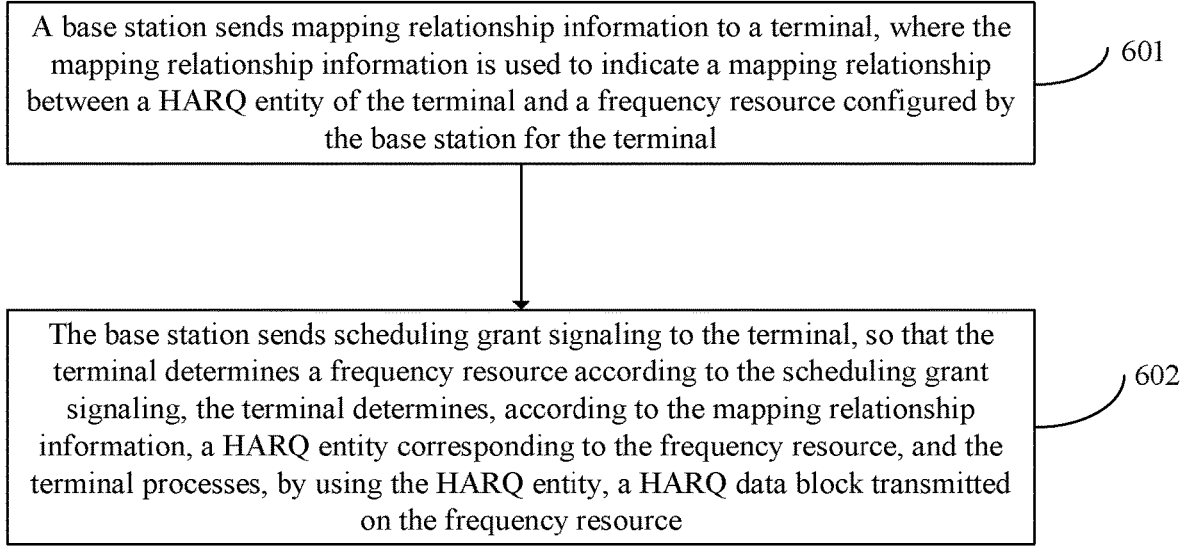
FIG. 16 is a schematic diagram of another embodiment of a data processing method according to the embodiments.

Referring to FIG. 16, another embodiment of the data processing method includes the following steps.

601. A base station sends mapping relationship information to a terminal, where the mapping relationship information is used to indicate a mapping relationship between a HARQ entity of the terminal and a frequency resource configured by the base station for the terminal.

The base station determines, according to the frequency resource configured for the terminal and obtained HARQ entity resource capability information of the terminal, the mapping relationship between a HARQ entity of the terminal and a frequency resource configured by the base station for the terminal, and sends the mapping relationship information to the terminal, so that the terminal can determine, according to the mapping relationship information, a HARQ entity corresponding to a carrier.

602. The base station sends scheduling grant signaling to the terminal, so that the terminal determines a frequency resource according to the scheduling grant signaling, the terminal determines, according to the mapping relationship information, a HARQ entity corresponding to the frequency resource, and the terminal processes, by using the HARQ entity, a HARQ data block transmitted on the frequency resource.

The scheduling grant signaling may or may not include information about the scheduled frequency resource (e.g., a cell index). If the scheduling grant signaling includes the information about the scheduled frequency resource, the terminal determines, according to the frequency resource information, the frequency resource that the terminal needs to use. If the scheduling grant signaling does not include the information about the scheduled frequency resource, the terminal determines that the required frequency resource is a frequency resource used for transmitting the scheduling grant signaling.

In this embodiment of the present disclosure, when a terminal receives information that is sent from a base station and that is used to indicate a mapping relationship between a HARQ entity of the terminal and a frequency resource configured by the base station for the terminal, even if a quantity of frequency resources configured by the base station for the terminal is greater than a quantity of HARQ entities supported by the terminal, after determining a configured frequency resource, the terminal can determine, according to the mapping relationship information, a HARQ entity corresponding to the frequency resource, and process, by using the HARQ entity, a HARQ data block transmitted on the frequency resource. A HARQ entity is shared, so that during transmission of a HARQ data block with the terminal, the base station can select one or more carriers corresponding to the HARQ entity. Therefore, carrier communication channels for real-time transmission between the base station and the terminal are increased, to improve transmission efficiency. Furthermore, an opportunity is provided for the terminal to select a high-quality carrier channel, to improve transmission quality.

In the foregoing embodiment, a base station sends mapping relationship information to a terminal, where the mapping relationship information is used to indicate a mapping relationship between a HARQ entity of the terminal and a frequency resource configured by the base station for the terminal; and the base station sends scheduling grant signaling to the terminal, so that the terminal determines a frequency resource according to the scheduling grant signaling, the terminal determines, according to the mapping relationship information, a HARQ entity corresponding to the frequency resource, and the terminal processes, by using the HARQ entity, a HARQ data block transmitted on the frequency resource. In actual application, the frequency resource may include a configured carrier; the mapping relationship information includes: a carrier list and a HARQ entity index or identifier corresponding to each carrier in the carrier list; or carrier group information, where a quantity of carrier groups in the carrier group information is less than or equal to a maximum quantity of HARQ entities supported by the terminal, and carriers in a same carrier group are corresponding to a same HARQ entity; or a carrier list and a sequence number of each carrier in the carrier list; or a carrier list, and a sequence number of each carrier and status information of each carrier in the carrier list, where a status of the carrier includes any one of an active state or an inactive state. The following provides detailed description.

Figure 17:
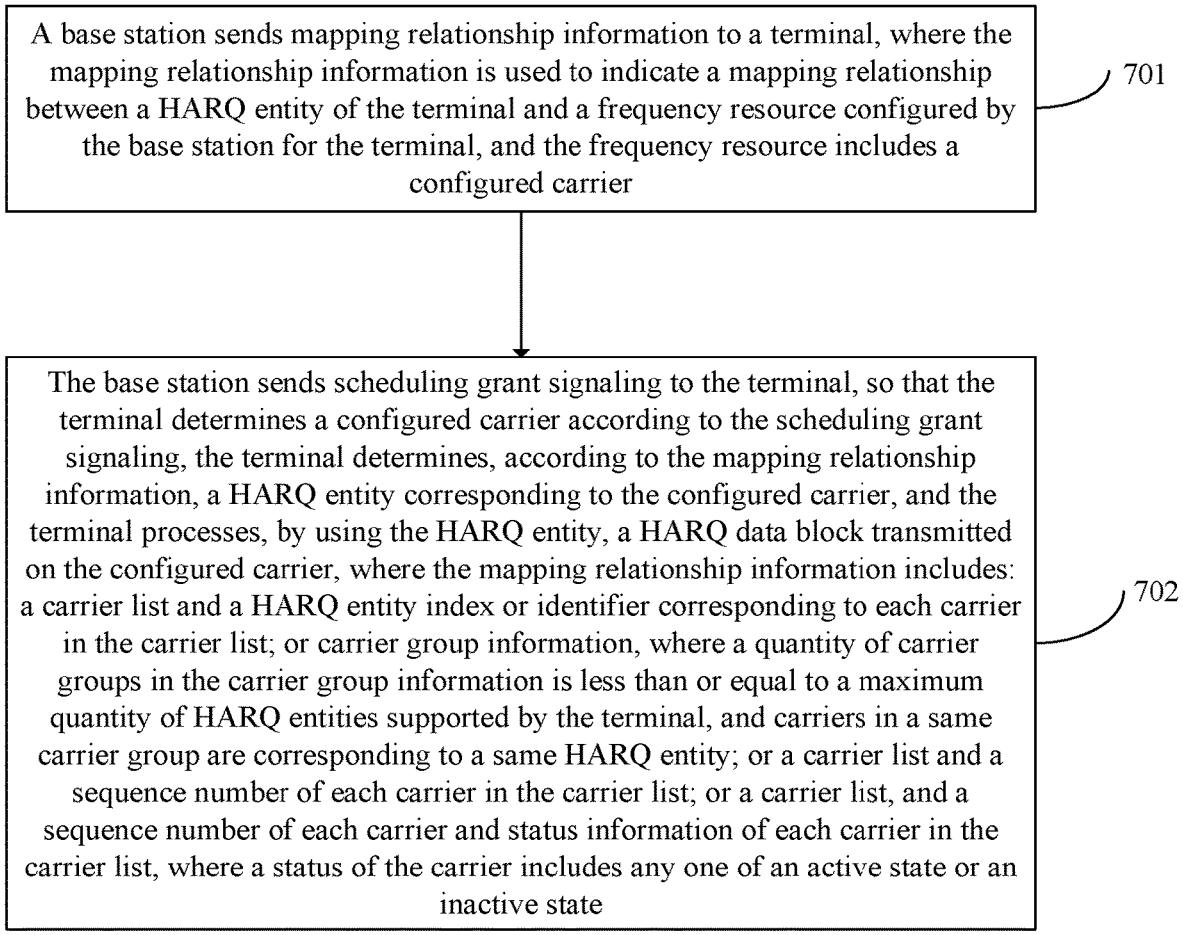
FIG. 17 is a schematic diagram of another embodiment of a data processing method according to the embodiments.

Referring to FIG. 17, another embodiment of the data processing method includes the following steps.

701. A base station sends mapping relationship information to a terminal, where the mapping relationship information is used to indicate a mapping relationship between a HARQ entity of the terminal and a frequency resource configured by the base station for the terminal, and the frequency resource includes a configured carrier.

The configured carrier is a carrier configured by the base station for the terminal. It should be noted that the frequency resource may be alternatively a channel configured by the base station for the terminal. Both the carrier and the channel are expression manners of a frequency resource in wireless transmission. In addition, in a wireless transmission scenario, a carrier may be divided into multiple subchannels, and the frequency resource may be alternatively the multiple subchannels in the carrier.

Optionally, the terminal may receive, by receiving an RRC reconfiguration message sent from the base station, the mapping relationship information sent from the base station.

702. The base station sends scheduling grant signaling to the terminal, so that the terminal determines a configured carrier according to the scheduling grant signaling, the terminal determines, according to the mapping relationship information, a HARQ entity corresponding to the configured carrier, and the terminal processes, by using the HARQ entity, a HARQ data block transmitted on the configured carrier, where the mapping relationship information includes: a carrier list and a HARQ entity index or identifier corresponding to each carrier in the carrier list; or carrier group information, where a quantity of carrier groups in the carrier group information is less than or equal to a maximum quantity of HARQ entities supported by the terminal, and carriers in a same carrier group are corresponding to a same HARQ entity; or a carrier list and a sequence number of each carrier in the carrier list; or a carrier list, and a sequence number of each carrier and status information of each carrier in the carrier list, where a status of the carrier includes any one of an active state or an inactive state.

The scheduling grant signaling may or may not include information about the configured carrier scheduled (e.g., a cell index). If the scheduling grant signaling includes the information about the configured carrier scheduled, the terminal determines, according to the information about the configured carrier, the configured carrier that the terminal needs to use. If the scheduling grant signaling does not include the information about the configured carrier scheduled, the terminal determines that the required configured carrier is a configured carrier used for transmitting the scheduling grant signaling. For detailed description on how the terminal determines the configured carrier, determines the HARQ entity corresponding to the configured carrier, and processes, by using the HARQ entity, the HARQ data block transmitted on the configured carrier, refer to the description in the embodiments of FIG. 12 to FIG. 14.

In another implementation, the scheduling grant signaling includes a configured carrier identifier and an indication message of the HARQ entity corresponding to the configured carrier, so that the terminal determines the configured carrier according to the configured carrier identifier, and determines, according to the indication message, the HARQ entity corresponding to the configured carrier. For detailed description, refer to the description in the embodiment of FIG. 15.

In this embodiment of the present disclosure, mapping relationship information sent by a base station to a terminal includes different forms of mapping relationship information between a HARQ entity of the terminal and a configured carrier configured by the base station for the terminal; after receiving a form of mapping relationship information sent from the base station, the terminal may determine a HARQ entity corresponding to the configured carrier, and may process, by using the HARQ entity, a HARQ data block transmitted on the configured carrier. In this way, even if a quantity of frequency resources configured by the base station for the terminal is greater than a quantity of HARQ entities supported by the terminal, after determining a configured frequency resource, the terminal can determine, according to the mapping relationship information, a HARQ entity corresponding to the frequency resource, and process, by using the HARQ entity, a HARQ data block transmitted on the frequency resource. A HARQ entity is shared, carrier communication channels for real-time transmission between the base station and the terminal are increased, and transmission efficiency is improved.

In the description of the foregoing embodiment, M carriers are separately designated to one of N sets of resources, where M>N, to implement data transmission over more carriers by using the N sets of resources. The network indicates, to the terminal by using a layer 3 configuration message, which HARQ entity is used by a configured carrier or channel. Multiple carriers or channels may be designated for a same HARQ entity. It should be noted that the network may alternatively indicate, to the terminal by using layer 2 or layer 1 control signaling, which HARQ entity is used by the configured carrier or channel. Information about which HARQ entity is used by the carrier or channel may be alternatively designated by the terminal, and then told to the network by using layer 2 or layer 1 control signaling. For example, after receiving a carrier or channel configuration message, the terminal determines, according to a HARQ entity supporting capability of the terminal and a current internal use situation of a HARQ entity, which HARQ entity is to be used for the configured carrier or channel, and informs the network of the HARQ entity.

No matter whether the network or the terminal designates which HARQ entity is used by the configured carrier or channel, a result of the designation needs to be informed to the other party. Which HARQ entity is used by the configured carrier or channel may be expressed in a notification message as a HARQ entity identifier or index, or implicitly expressed by a carrier group or a channel group to which the configured carrier or channel belongs (for example, configured carriers belonging to a same carrier group use a same HARQ entity, which HARQ entity is used does not need to be explicitly indicated, and an explicit HARQ identifier or index is not needed either), or implicitly expressed by using a sequence or a position of the configured carrier or channel in all configured carriers or channels in a configuration message (e.g., the $n^{th}$ configured carrier is specified to use a HARQ entity whose index=n mod 8), or implicitly expressed by using status setting and/or a sequence or a position of the carrier or channel in the layer 2 control signaling (for example, the $n^{th}$ active carrier is specified to use a HARQ entity whose index=n mod 8).

Herein, a HARQ entity resource is an example of a restricted resource of the terminal. The resource designated for the configured carrier or channel is also applicable to a radio frequency transmit receive resource, a baseband processing resource, a data buffering resource, or another restricted resource. This is not limited herein.

The present disclosure may be applied to a 3GPP radio communications system, for example, a scenario in which a base station configures multiple carriers for a terminal for carrier aggregation, or a scenario in which a base station configures, for a terminal, a broadband carrier including multiple channels. In the broadband carrier scenario, a frequency bandwidth of a carrier may reach, for example, 80 MHz, and the carrier is divided into four 20 MHz channels. At a moment, a network communicates with the terminal by using only one channel. At different moments, the network may communicate with the terminal by using different channels, so as to obtain a frequency selectivity gain. The network configures that the four channels of the carrier use a same HARQ entity. The present disclosure also applies to a WiFi communications system.

In the foregoing embodiments, a HARQ entity resource of the terminal is restricted. The present disclosure also applies to a case in which another resource of the terminal is restricted, for example, a radio frequency chain. In the following, an embodiment provides a data processing method, to share a radio frequency chain when a radio frequency resource of the terminal is restricted:

receiving, by the terminal, mapping relationship information sent from a base station, where the mapping relationship information is used to indicate a mapping relationship between a radio frequency chain of the terminal and a frequency resource configured by the base station for the terminal;

determining, by the terminal, a frequency resource;

determining, by the terminal according to the mapping relationship information, a radio frequency chain corresponding to the frequency resource; and processing, by the terminal by using the radio frequency chain, a signal transmitted on the frequency resource.

Figure 18:
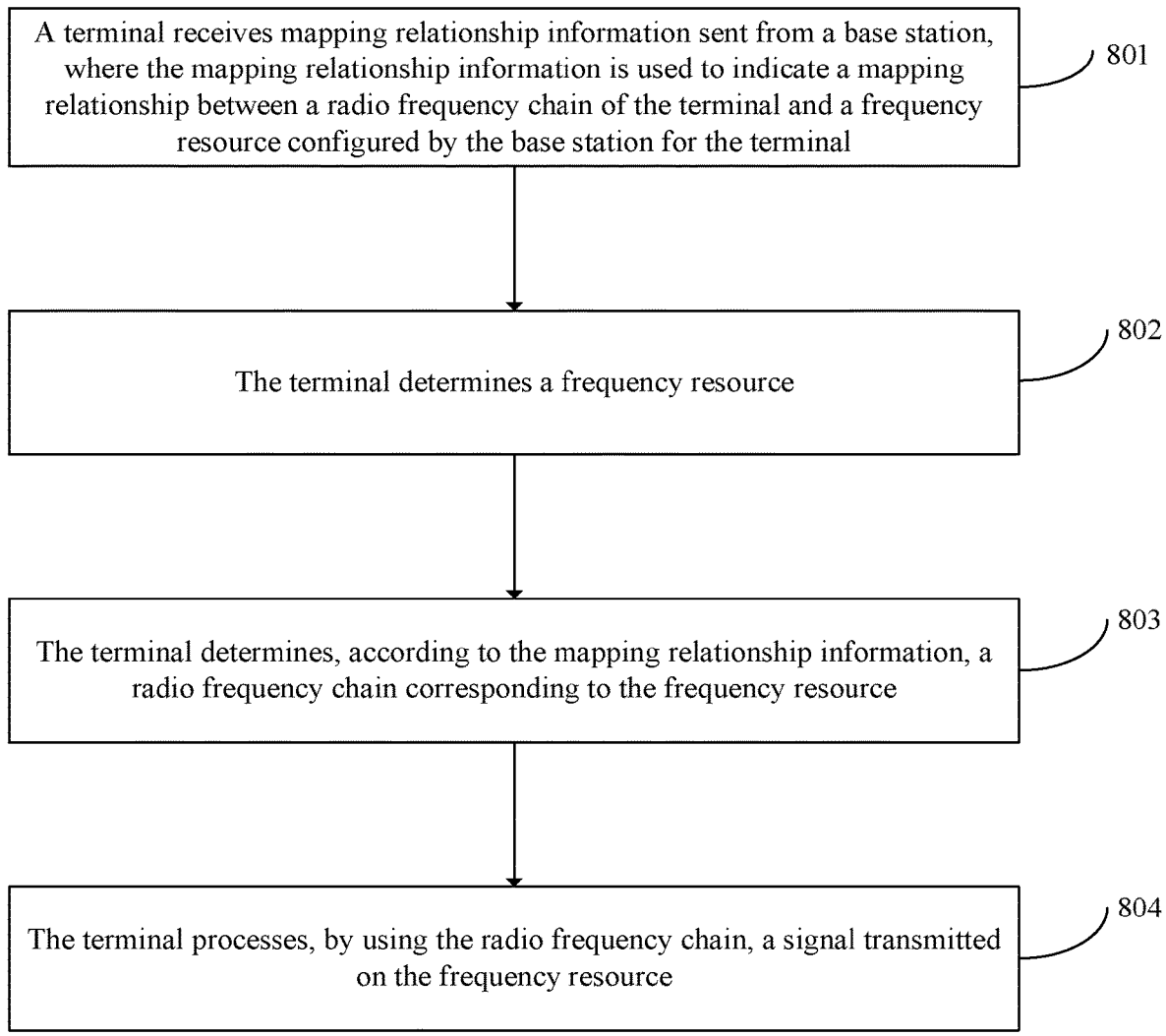
FIG. 18 is a schematic diagram of another embodiment of a data processing method according to the embodiments.

As shown in FIG. 18, a data processing method according to an embodiment includes the following steps.

801. A terminal receives mapping relationship information sent from a base station, where the mapping relationship information is used to indicate a mapping relationship between a radio frequency chain of the terminal and a frequency resource configured by the base station for the terminal.

Before the base station sends the mapping relationship information to the terminal, the base station first obtains hybrid automatic repeat request radio frequency chain resource capability information of the terminal. The radio frequency chain resource capability information includes information about a maximum quantity of radio frequency chains supported by the terminal. The base station may obtain the radio frequency chain resource capability information of the terminal in the following manners: The terminal reports, to the base station, the information about the maximum quantity of radio frequency chains supported by the terminal, for example, eight, in a process of connecting to a network or after connecting to a network; when the terminal is handed over or establishes a connection to a new base station, the new base station may obtain, in a handover preparation process from the base station the terminal is previously connected to, the information about the maximum quantity of radio frequency chains supported by the terminal; the base station may alternatively obtain, by using an MME, the information about the maximum quantity of radio frequency chains supported by the terminal; or the radio frequency chain resource capability information of the terminal is stored in the base station; or the base station determines the radio frequency chain resource capability information of the terminal according to protocol specifications, for example, a maximum quantity of radio frequency chains supported by the terminal is eight by default. The base station determines, according to the frequency resource configured for the terminal and the obtained radio frequency chain resource capability information of the terminal, the mapping relationship between a radio frequency chain of the terminal and a frequency resource configured by the base station for the terminal, and sends the mapping relationship information to the terminal, so that the terminal can determine, according to the mapping relationship information, a radio frequency chain corresponding to a carrier.

802. The terminal determines a frequency resource.

Generally, each time when scheduling the terminal to send or receive data, the base station indicates to the terminal scheduling grant signaling for the frequency resource used in the scheduling, so that the terminal can determine, according to the scheduling grant signaling, the frequency resource used in the scheduling, to send data. The scheduling grant signaling may or may not include information about the scheduled frequency resource (e.g., a cell index). If the scheduling grant signaling includes the information about the scheduled frequency resource, the terminal determines, according to the frequency resource information, the frequency resource that the terminal needs to use. If the scheduling grant signaling does not include the information about the scheduled frequency resource, the terminal determines that the required frequency resource is a frequency resource used for transmitting the scheduling grant signaling.

803. The terminal determines, according to the mapping relationship information, a radio frequency chain corresponding to the frequency resource.

After receiving the scheduling grant signaling, the terminal may determine, according to the mapping relationship information, the radio frequency chain corresponding to the frequency resource, so that the base station and the terminal implement transmission of a signal.

804. The terminal processes, by using the radio frequency chain, a signal transmitted on the frequency resource.

After determining the frequency resource and the corresponding radio frequency chain, the terminal processes, by using the radio frequency chain, a radio signal transmitted on the frequency resource, that is, performing digital-to-analog conversion, and/or signal power amplification, or another processing on a digital signal that needs to be transmitted on the frequency resource, and performing signal sampling and digital signal generation processing on a radio signal received by using the frequency resource.

In this embodiment of the present disclosure, a terminal receives mapping relationship information sent from a base station, where the mapping relationship information is used to indicate a mapping relationship between a radio frequency chain of the terminal and a frequency resource configured by the base station for the terminal; the terminal determines a frequency resource; the terminal determines, according to the mapping relationship information, a radio frequency chain corresponding to the frequency resource; and the terminal performs, by using the radio frequency chain, digital-to-analog conversion and/or signal power amplification, or another processing on a digital signal transmitted on the frequency resource. In this way, when the terminal receives information that is sent from the base station and that is used to indicate the mapping relationship between a radio frequency chain of the terminal and a frequency resource configured by the base station for the terminal, even if a quantity of frequency resources configured by the base station for the terminal is greater than a quantity of radio frequency chains supported by the terminal, after determining a configured frequency resource, the terminal may determine, according to the mapping relationship information, the radio frequency chain corresponding to the frequency resource, and process, by using the radio frequency chain, a signal transmitted on the frequency resource. A radio frequency chain is shared, so that during transmission of a HARQ data block with the terminal the base station can select one or more carriers corresponding to the radio frequency chain. Therefore, carrier communication channels for real-time transmission between the base station and the terminal are increased, to improve transmission efficiency. Furthermore, an opportunity is provided for the terminal to select a high-quality carrier channel, to improve transmission quality.

The foregoing embodiments are merely intended for describing the technical solutions of the present disclosure, but should not be construed as limiting the described embodiments. Although the embodiments are described in detail with reference to the drawings, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data processing method, comprising:
    receiving, by a terminal, mapping relationship information sent from a base station, wherein the mapping relationship information is used to indicate a mapping relationship between a hybrid automatic repeat request (HARQ) entity of the terminal and a frequency resource configured by the base station for the terminal;
    determining, by the terminal, the frequency resource;
    determining, by the terminal according to the mapping relationship information, the HARQ entity corresponding to the frequency resource;
    performing, by the terminal by using the HARQ entity, first processing on a first HARQ data block that needs to be transmitted to the base station, where the first processing includes generating the first HARQ data block; and
    performing, by the terminal by using the HARQ entity, second processing on a second HARQ data block, wherein the second processing comprises:
    if the first HARQ data block is transmitted to the base station and the second HARQ data block is a retransmitted data block and received from the base station by using different frequency resources, selecting, by the terminal according to the mapping relationship information, the HARQ entity to perform data decoding on the second HARQ data block.

2. The method according to claim 1, wherein:
    the frequency resource comprises a configured carrier;
    the determining, by the terminal, the frequency resource comprises: determining, by the terminal, the configured carrier according to received scheduling grant signaling that comprises a configured carrier identifier and that is sent from the base station, wherein the scheduling grant signaling further comprises an indication message of a HARQ entity corresponding to the configured carrier; and
    the determining, by the terminal according to the mapping relationship information, the HARQ entity corresponding to the frequency resource comprises: determining, by the terminal according to the indication message, the HARQ entity corresponding to the configured carrier.

3. The method according to claim 1, further comprising:
    when failing to send the first HARQ data block to the base station and receiving no scheduling grant signaling used for retransmitting the first HARQ data block, determining, by the terminal, a retransmission frequency resource corresponding to the HARQ entity; and
    retransmitting, by the terminal, the first HARQ data block to the base station by using the retransmission frequency resource.

4. The method according to claim 1, wherein the second processing further comprises:
    if the data decoding fails, performing, by the terminal, combined decoding on the second HARQ data block and content of the second HARQ data block in a receive buffer.

5. The method according to claim 1, wherein the frequency resource comprises a configured carrier; and the mapping relationship information comprises:
    a carrier list and a HARQ entity index corresponding to each carrier in the carrier list.

6. The method according to claim 1, wherein the frequency resource comprises a configured carrier; and
    wherein the mapping relationship information comprises:
    carrier group information, wherein a quantity of carrier groups in the carrier group information is less than or equal to a maximum quantity of HARQ entities supported by the terminal, and carriers in a same carrier group are corresponding to a same HARQ entity.

7. The method according to claim 1, wherein the frequency resource comprises a configured carrier; and
    wherein the mapping relationship information comprises:

a carrier list and a sequence number of each carrier in the carrier list.

8. The method according to claim 1, wherein the frequency resource comprises a configured carrier; and
wherein the mapping relationship information comprises:
a carrier list, and a sequence number of each carrier and status information of each carrier in the carrier list, wherein a status of the carrier comprises any one of an active state or an inactive state.

9. A terminal, comprising:
a receiver, configured to receive mapping relationship information sent from a base station, wherein the mapping relationship information is used to indicate a mapping relationship between a HARQ entity of the terminal and a frequency resource configured by the base station for the terminal; and
a processor, configured to determine the frequency resource; determine the HARQ entity corresponding to the frequency resource according to the mapping relationship information; and perform, by using the HARQ entity, first processing on a first HARQ data block that needs to be transmitted to the base station, where the first processing includes generating the first HARQ data block, and second processing on a second HARQ data block, wherein the second processing comprises:
if the first HARQ data block is transmitted to the base station and the second HARQ data block is a retransmitted data block and received from the base station by using different frequency resources, select, according to the mapping relationship information, the HARQ entity to perform data decoding on the second HARQ data block.

10. The terminal according to claim 9, wherein the processor is further configured to:
determine a configured carrier according to received scheduling grant signaling that comprises a configured carrier identifier and that is sent from the base station, wherein the scheduling grant signaling further comprises an indication message of the HARQ entity corresponding to the configured carrier; and
determine, according to the indication message, the HARQ entity corresponding to the configured carrier.

11. The terminal according to claim 9, wherein the processor is further configured to: when the terminal fails to send the first HARQ data block and receives no scheduling grant signaling used for retransmitting the first HARQ data block, determine a retransmission frequency resource corresponding to the HARQ entity; and
wherein the terminal further comprises a transmitter, configured to: after the retransmission frequency resource corresponding to the HARQ entity is determined, retransmit the first HARQ data block to the base station by using the retransmission frequency resource.

12. The terminal according to claim 9, wherein the processor is further configured to: if the data decoding fails, perform combined decoding on the second HARQ data block and content of the second HARQ data block in a receive buffer.

13. The terminal according to claim 9, wherein the frequency resource comprises a configured carrier; and
wherein the mapping relationship information comprises:
a carrier list and a HARQ entity index corresponding to each carrier in the carrier list.

14. The terminal according to claim 9, wherein the frequency resource comprises a configured carrier; and
wherein the mapping relationship information comprises:
carrier group information, wherein a quantity of carrier groups in the carrier group information is less than or equal to a maximum quantity of HARQ entities supported by the terminal, and carriers in a same carrier group are corresponding to a same HARQ entity.

15. The terminal according to claim 9, wherein the frequency resource comprises a configured carrier; and
wherein the mapping relationship information comprises:
a carrier list and a sequence number of each carrier in the carrier list.

16. The terminal according to claim 9, wherein the frequency resource comprises a configured carrier; and
wherein the mapping relationship information comprises:
a carrier list, and a sequence number of each carrier and status information of each carrier in the carrier list, wherein a status of the carrier comprises any one of an active state or an inactive state.

* * * * *